US008886247B1

(12) United States Patent
Price et al.

(10) Patent No.: US 8,886,247 B1
(45) Date of Patent: Nov. 11, 2014

(54) PROXIMITY BASED POWER THROTTLING

(75) Inventors: Andrew D. Price, Cupertino, CA (US);
Jay P. Desai, Cupertino, CA (US);
Kiran K. Edara, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 342 days.

(21) Appl. No.: 13/252,320

(22) Filed: Oct. 4, 2011

(51) Int. Cl.
*H04B 1/04* (2006.01)

(52) U.S. Cl.
USPC ............. 455/522; 455/575.1; 455/575.2; 455/575.3; 455/575.4; 370/318

(58) Field of Classification Search
USPC ............. 455/575.1–575.4, 522; 370/318
See application file for complete search history.

(56) References Cited

U.S. PATENT DOCUMENTS

| | | | |
|---|---|---|---|
| 2007/0232369 A1* | 10/2007 | Yamashita et al. | 455/575.1 |
| 2009/0088204 A1* | 4/2009 | Culbert et al. | 455/556.1 |
| 2010/0195549 A1* | 8/2010 | Aragon et al. | 370/311 |
| 2010/0248622 A1* | 9/2010 | Lyell Kirby et al. | 455/41.1 |
| 2010/0271279 A1* | 10/2010 | Johnson | 343/845 |
| 2010/0304730 A1* | 12/2010 | Huang et al. | 455/419 |
| 2011/0012793 A1* | 1/2011 | Amm et al. | 343/702 |
| 2011/0086626 A1* | 4/2011 | Kerr | 455/418 |
| 2011/0119144 A1* | 5/2011 | Grilli et al. | 705/26.1 |
| 2011/0212755 A1* | 9/2011 | Ishikawa et al. | 455/575.1 |
| 2012/0159204 A1* | 6/2012 | Tang et al. | 713/310 |

* cited by examiner

*Primary Examiner* — Bobbak Safaipour
(74) *Attorney, Agent, or Firm* — Lowenstein Sandler LLP

(57) ABSTRACT

Methods and systems for delaying a determination to adjust a first power transmit level when a presence of a human body part is detected proximate to a user device are described. A user device detects a presence of a human body part and, in response, determines whether to adjust the first transmit power level to a second transmit power level, and delays the determination by a specified amount of time that is programmable. The user device transmits the information using the second transmit power level when the presence of the human body part is detected.

36 Claims, 8 Drawing Sheets

PROXIMITY BASED POWER THROTTLING

BACKGROUND OF THE INVENTION

A large and growing population of users enjoys entertainment through the consumption of digital media items, such as music, movies, images, electronic books, and so on. Users employ various electronic devices to consume such media items. Among these electronic devices are electronic book readers, cellular telephones, personal digital assistants (PDAs), portable media players, tablet computers, netbooks, and the like. These electronic devices wirelessly communicate with a communications infrastructure to enable the consumption of the digital media items. Typically, the communications infrastructure dictates transmit power levels for the electronic devices to use when transmitting data to the communications infrastructure. The electronic devices do not include transmit power managers for making their own determinations regarding what transmit power levels to use.

Some bodies of research suggest that radiation output by electronic devices during wireless transmission of data can cause damage to the human body when such radiation is absorbed. However, since electronic devices lack the ability to control their transmit power levels, such electronic devices cannot adjust their transmit power levels to reduce user exposure to radiation. This may also consequently cause these electronic devices to fail to comply with FCC regulations regarding the specific absorption rate (SAR) permitted to electronic devices. SAR is a measure of the rate at which energy is absorbed by the body when exposed to a radio frequency (RF) electromagnetic field. In addition, the user's body can block the RF electromagnetic field in the direction of the user's body, thus reducing the gain in that direction. This may also cause difficulty in meeting the SAR requirements.

Some electronic devices are capable of connecting with multiple wireless communication infrastructures concurrently. Each such connection to a wireless communication infrastructure causes radiation to be emitted, thus causing such devices to expose users to even greater amounts of radiation.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION OF THE PRESENT INVENTION

Figure 1:
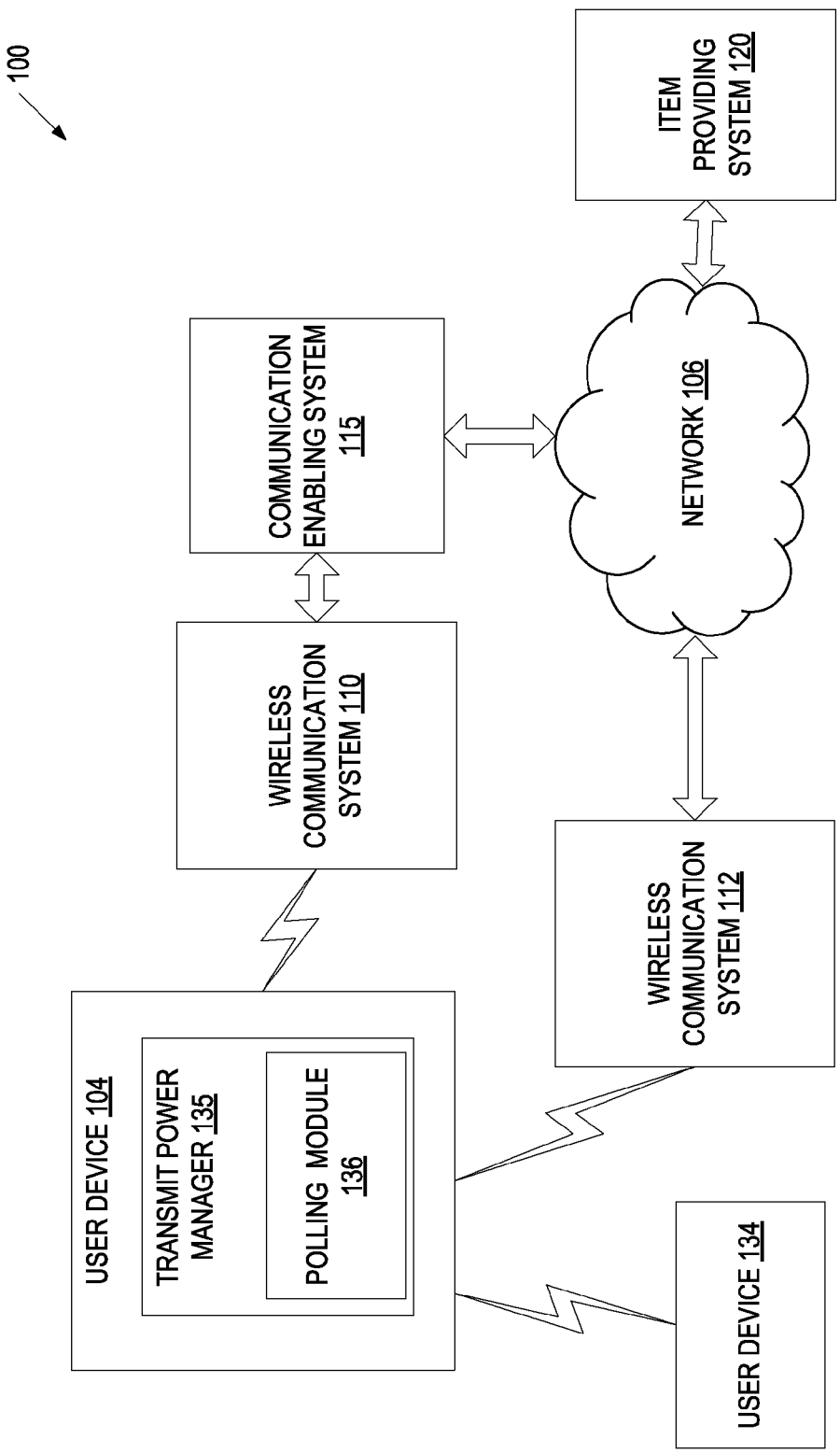
FIG. 1 is a block diagram of an exemplary network architecture in which embodiments of a transmit power manager, having a polling module, may operate.

Methods and systems for delaying a determination to adjust a specified power transmit level when a presence of a human body part is detected proximate to a user device are described. The user device may be any content rendering device that includes a wireless modem for connecting the user device to a network. Examples of such user devices include electronic book readers, cellular telephones, personal digital assistants (PDAs), portable media players, tablet computers, netbooks, and the like.

In one embodiment, the user device transmits first data at a first transmit power level. In response to the user device detecting a presence of a human body part, determines whether to adjust a first transmit power level to a second transmit power level after a delay of a programmable, specified amount of time. The user device transmits second data using the second transmit power level when the presence of the human body part. This may be done to reduce a specific absorption rate (SAR). Alternatively, this may be done to reduce power consumption by the user device. It should be noted that first data and second data are used to indicate that same data is not necessarily being retransmitted. Rather, the data may be data of a data stream being transmitted by the user device. For example, the user device may normally or initially transmit the data stream with the first transmit power, and when the user device determines to adjust the first transmit power level to the second transmit power level, the user device can continue to transmit later portions of the data stream using the second transmit power as would be appreciated by one of ordinary skill in the art having the benefit of this disclosure.

In another embodiment, in response to detection of the human body part, the user device polls a current transmit power (TX power) of the user device at a first polling rate. At each polling instance, the user device determines whether the current transmit power exceeds a transmit power threshold. In response to the current transmit power exceeding the transmit power threshold at one of the polling instances, the user device adjusts the first polling rate to a second polling rate and polls the current transmit power at the second polling rate. In response to the current transmit power still exceeding the transmit power threshold at a subsequent polling instance, the user device reduces the specified transmit power level by a first specified amount to a second transmit power level, and transmits the data at the second transmit power level. It should be noted that in various embodiments, the transmit power level is specified by the wireless communication network, and the user device in normal operation transmits using the specified transmit power level. Then when certain conditions apply, such as those described herein, the user device transmits data at a reduced transmit power level.

SAR is dependent on the average power transmitted. Power throttling can be used to back off the average power transmitted to ensure that the device complies with FCC regulations concerning radiation absorbed by human tissue, also referred to as SAR requirements. A procedure known as SAR testing quantifies this absorbed radiation. A SAR number is obtained while testing the device in close proximity (zero separation) to a gel that simulates the RF properties of human tissue while it is transmitting at full power. To comply with FCC regulations, proximity to tissue is sensed (e.g. by a capacitive proximity sensor) and power is reduced according to some algorithm. However, these conventional devices throttle the power regardless of the operations of the user. This type of power throttling may negatively impact the user experience. For example, by throttling the power upon detection of a human body part, the user device may lose a network connection or may slow an application down to a point that could frustrate the user. The embodiments described herein can minimize the effect on the user experience while complying with SAR regulations. In some embodiments, a polling module is used to determine when to throttle the power, how much to throttle, and how often to poll to determine when to throttle. By polling the current transmit power when the human body part is detected, the user device can make a determination to reduce the transmit power level, but can do so after a delay. The embodiments described herein have the ability to make the determination to adjust the transmit power levels being used by the user device, and delay when the determination is made. The amount of delay, how much to throttle, and how many times to throttle can be programmed by a user, an administrator, or a manufacturer or developer of the device. The embodiments described herein provide mechanisms to allow devices to pass regulatory requirements while minimally impacting user experience.

FIG. 1 is a block diagram of an exemplary network architecture 100 in which embodiments of a transmit power manager 135, having a polling module 136, may operate. The network architecture 100 may include an item providing system 120 and one or more user devices 104 capable of communicating with the item providing system 120 via a network 106 (e.g., public network such as the Internet or private network such as a local area network (LAN)).

The user devices 104 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 104 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The item providing system 120 and the user devices 104 deliver and/or receive items, upgrades, and/or other information via the network 106. For example, the user devices 104 may download or receive items from the item providing system 102. The item providing system 120 also receives various requests, instructions and other data from the user devices 104 via the network 106. The item providing system 120 may include one or more machines (e.g., one or more server computer systems, routers, gateways, etc.) that have processing and storage capabilities to provide the above functionality.

Communication between the item providing system 120 and the user device 104 may be enabled via any communication infrastructure. One example of such an infrastructure includes a combination of a wide area network (WAN) and wireless infrastructure, which allows a user to use the user device 104 to purchase items and consume items without being tethered to the item providing system 120 via hardwired links. The wireless infrastructure may be provided by one or multiple wireless communications systems, such as wireless communications system 110 and wireless communication system 112. One of the wireless communication systems 110, 112 may be a wireless fidelity (WiFi) hotspot connected with the network 106. Another of the wireless communication systems 110, 112 may be a wireless carrier system that can be implemented using various data processing equipment, communication towers, etc. Alternatively, or in addition, the wireless carrier system may rely on satellite technology to exchange information with the user device 104.

The communication infrastructure may also include a communication-enabling system 115 that serves as an intermediary in passing information between the item providing system 120 and the wireless communication system 110. The communication-enabling system 115 may communicate with the wireless communication system 110 (e.g., a wireless carrier) via a dedicated channel, and may communicate with the item providing system 120 via a non-dedicated communication mechanism, e.g., a public Wide Area Network (WAN) such as the Internet.

In one embodiment, while the user device 104 is connected with the wireless communication system 110 and/or wireless communication system 112, one or both of the wireless communication systems periodically or continuously specifies transmit power levels for the user device 104 to use for transmissions to that wireless communication system 110, 112. For example, conventional wireless carrier systems dictate what transmit power levels mobile phones are to use for communications with the wireless carrier systems. The transmit power levels that the wireless carrier systems specify continuously vary based on environmental factors such as a current signal to noise ratio, distance between the mobile phone and a nearest cell tower, obstacles between the mobile phone and the nearest cell tower, and so on. Unfortunately, wireless communication systems 110, 112 typically consider only signal strength when specifying what transmit power levels the user device is to use in transmissions of data. Wireless communication systems 110, 112 typically do not take into consideration radiation emitted by the user device 104 that may be absorbed by users of the user device 104, interference with other wireless connections, battery life of the user device 104, or other factors that may also be important to a user when specifying transmit power levels. Additionally, the user device 104 may have additional information that is not available to the wireless communication systems 110, 112. This additional information may be used to help determine what transmit power levels should be used. For example, the additional information may be whether the user device is in proximity with a human body part, and reduce the power accordingly.

In addition to, or in place of, other efforts to control the transmit power levels of the user device independent of the specified transmit power levels dictated by the wireless communication systems 110, 112, the embodiments described herein reduce the power of the user device when the user device proximate to the user device, e.g., is touching or in close proximity to a human body part after a specified amount of time, as determined by the power manager 135 and the polling module 136 as described in more detail below. The embodiments described herein overcome the above shortcomings of conventional power throttling solutions by detecting a presence of a human body part, and, in response, determining whether to adjust the specified transmit power level to a second transmit power level. The determination is delayed by the user device by a specified amount of time. The specified amount of time is programmable.

In one embodiment, the user device 104 includes a transmit power manager 135 that declares a specified power class that transmits at a specified power level (also referred to herein as the maximum allowable transmit power). In another embodiment, the transmit power manager 135 receives a specified transmit power level from the wireless communication system 110 in response to the declared power level by the user device. The power manager 135 can also perform its own analysis of what power class should be declared to determine what transmit power levels should be used for the transmission of data to the wireless communication system 110. The transmit power manager 135 can implement a power throttling algorithm to determine when to reduce the transmit power level after a specified amount of delay using the polling module 136. In one embodiment, the transmit power manager 135 receives an indication or determines itself that a human body part is detected proximate to the user device. In response, the polling module 136 starts polling a current transmit power at a polling rate. At each polling instance, the transmit power manager 135 determines whether the current transmit power exceeds a transmit power threshold. If the so, the transmit power manager 135 adjusts the polling rate to a second polling rate and polls the current transmit power at the second polling rate. In response to the current transmit power still exceeding the transmit power threshold at a subsequent polling instance, the transmit power manager 135 reduces the specified transmit power level by a first specified amount to a second transmit power level. In essence, the maximum allowable transmit power is reduced by a specified amount. The specified amount (e.g., PWR_Step NV) may be stored in memory and may be programmable. After reducing the specified transmit power level, the transmit power manager 135 instructs the modem to transmit the data at the second transmit power level. This may allow the user device to comply with SAR requirements, but provides flexibility as to when to reduce the specified transmit power level and how much to reduce. Alternatively, the transmit power manager 135 can achieve additional benefits than complying with SAR requirements, such as the ability to reduce the amount of power consumption for power saving modes of the user device, or the like.

In another embodiment, the user device 104 performs operations to determine what multi-slot class (e.g., GPRS class) to use for data transmission, and the polling module 136 can be used to determine when to throttle the power. In these embodiments, the power may be throttled by changing the multi-slot class to another multi-slot class that has a lower transmit power level than the current multi-slot class. For example, the wireless communication system 110 may declare the use device as being GPRS class 10, and the transmit power manager 135 instructs the modem to use the specified GPRS class power levels for data transmission. The user device 104 may detect the presence of a human body part, and, in response, the polling module 136 may determine when to make the power adjustment. When the polling module 136 determines that the power is to be adjusted, the transmit power manager 135 changes the GPRS class to GPRS class 8. In another embodiment, the transmit power manager 135 can change from GPRS class 11 to GPRS class 10 or to GPRS class 8 to reduce the transmit power for the uplink direction. Alternatively, other GPRS classes may be used. In one embodiment, the transmit power manager 135 may throttle the power in response to sensor data 246 as described in more detail below. In another embodiment, the transmit power manager 135 may throttle the power in response to detection of a user interaction condition, as described herein.

In other embodiments, user device 104 may declare a power class to be used for data transmission. In response to detecting a human body part or a user interaction condition, as described herein, the user device can declare a new power class that has uses less power than the previous power class. The user device 104 declares the new power class after the polling module 136 determines that the appropriate conditions apply to throttle the power. Transitioning between power classes reduces the power used by the user device, and can reduce SAR.

In addition to wirelessly connecting to a wireless communication system 110, 112, the user device 104 may also wirelessly connect with other user devices (e.g., user device 134). For example, user device 104 may form a wireless ad hoc (peer-to-peer) network with user device 134. In addition to controlling the transmit power levels used to communicate with the wireless communication systems 110, 112, the transmit power manager 135 may also control the transmit power used to communicate with other user devices 134.

Figure 2:
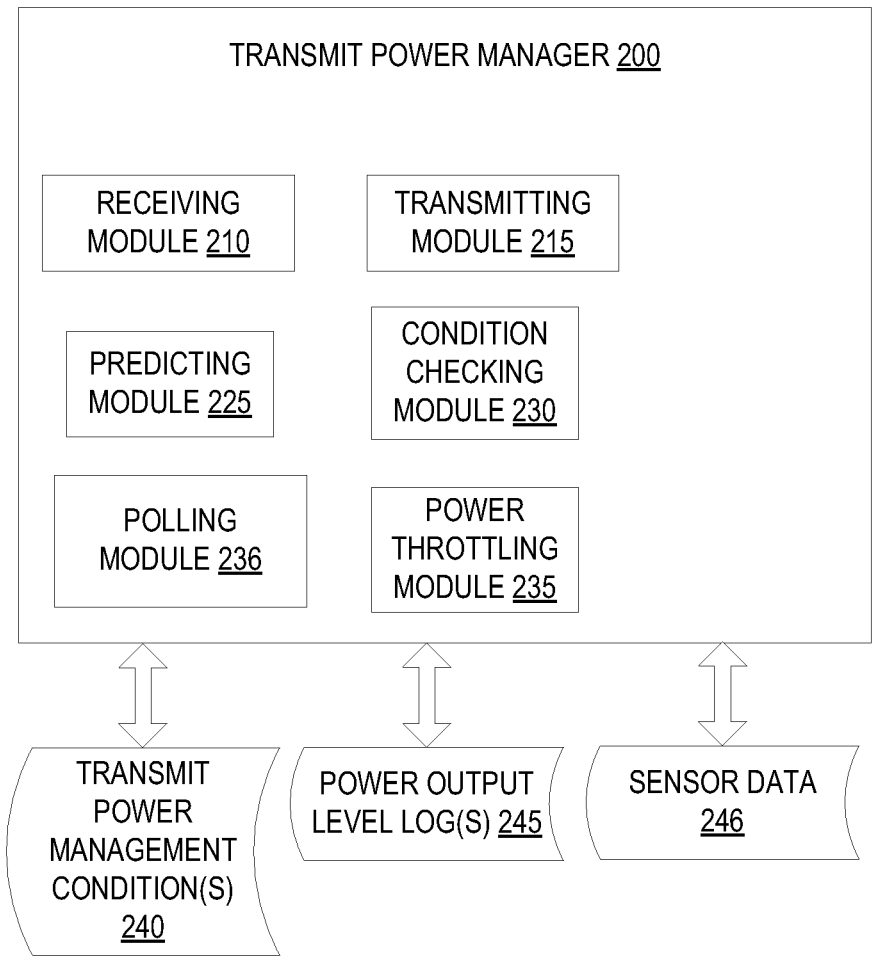
FIG. 2 is a block diagram of one embodiment of a transmit power manager.

FIG. 2 is a block diagram of one embodiment of a transmit power manager 200, which may correspond to the transmit power manager 135 of FIG. 1. In one embodiment, the transmit power manager 200 includes a receiving module 210, a transmitting module 215, a predicting module 225, a condition checking module 230, a power throttling module 235, and a polling module 236, which may correspond to the polling module 136 of FIG. 1. The receiving module 210 receives commands to transmit data. The commands to transmit data may identify the specified GPRS class or a power class to use for data transmission. The commands may also identify specified transmit power levels to use for data transmission, for example, the commands may specify that a transmit power level of +50 dbm is to be used), or may specify a current transmit power level as a change from a previously used transmit power level (e.g., an increase of 1 dbm or a decrease of 2 dbm). Commands may also indicate that a previously specified transmit power level should be used. Commands may originate from the wireless communication system, and may be routed to the transmit power manager 200 by a wireless modem and/or processor of the user device. These commands may also be received from other sources, such as applications running on the user device.

Condition checking module 230 determines whether any transmit power management conditions 240 apply to transmissions that are to be made. The transmit power management conditions 240 may include safety conditions, communications interference conditions, battery level conditions, power consumption conditions, and so on. The transmit power management conditions 240 may apply to communications via a particular wireless communication protocol, with a particular wireless communication system, associated with a particular application, etc. Some transmit power management conditions 240 may apply to multiple wireless protocols, wireless communications systems, applications, etc. For those transmit power management conditions 240 that apply to a current transmission, condition checking module 230 determines whether the conditions will be violated by the current transmission. For example, condition checking module 230 may determine whether transmit power management conditions will be violated by transmitting data at the specified transmit power level.

In one embodiment, the transmit power management conditions 240 include a human body part proximity condition. This condition may be violated (or alternatively satisfied) when a human body part is detected (e.g., when a user is holding the user device), or when a user device determines that a human body part is closer than a predetermined distance from an antenna of the user device. In one embodiment, the human body part proximity condition may be determined based on the sensor data 246. In another embodiment, the transmit management conditions 240 may include a user interaction condition indicative that a user is currently using the user device 104 to infer that a human body part is touching or in close proximity to the user device. In one embodiment, the human body part proximity condition or the user interaction condition may be computed by the processor (or other component) and provided as one of the transmit power management conditions 240 to the transmit power manager 200. Alternatively, the transmit power manager 200 may use the sensor data 246, or other user input data, to determine the human body part proximity condition or the user interaction condition based on the data.

The power management conditions 240 may include other conditions, such as maximum accumulated transmit power level condition that can be used separately or in combination with some of the other conditions to determine if the condition is violated, and to take appropriate action based on the violation. Another example is a communications interference condition for when there are two or more concurrent connections with different wireless communication system and/or user device. Another example is an active application condition that can be satisfied when a particular application (e.g., an ad hoc network application) is running on the user device or when a particular operation of a specified application is to be performed (e.g., a file transfer operation). Another example is a security condition, such as a maximum transmit distance condition, which may be satisfied when certain applications are active, when certain operations are being performed and/or when certain types of wireless connections are established. The maximum transmit distance condition may cause a transmit power level to be reduced to a level just powerful enough to transmit to nearby devices (e.g., to devices within a range of 6 feet from the user device) in order to increase transmission security by preventing devices outside of a maximum distance from receiving transmissions. Another example is a negative power throttling condition that specifies when power throttling should not occur. For example, one or more negative power throttling conditions can specify that, regardless of other power management conditions that may be violated, power throttling should not occur if a particular application is active, or a particular operation is being performed. For example, a power management condition may specify that transmit power level throttling should not occur while media items are being downloaded. Alternatively, the power management condition may specify that the transmit power level throttling should not occur when the data being transmitted is signaling data. Signaling data may be the data that is communicated to and from the wireless communication network and the user device to facilitate communication, such as voice data and non-voice data. It may be beneficial to allow this type of communication with the specified transmit power level, while power throttling non-voice data that can be retransmitted. In another embodiment, the transmit power level throttling may not occur when the data being transmitted is voice data, allowing a user to maintain an acceptable signal level to continue a telephone call. Alternatively, other conditions may be apply where power level throttling should not occur as would be appreciated by one of ordinary skill in the art having the benefit of this disclosure.

The transmit power management conditions 240 may be stored in volatile or nonvolatile memory of the user device 104. In one embodiment, the power management conditions 240 are hard coded into the user device, and cannot me modified. Alternatively, the transmit power management conditions 240 may be updated by modifying existing power management conditions, adding new power management conditions, or deleting existing power management conditions.

Returning to FIG. 2, in one embodiment, the transmit power manager 200 includes a predicting module 225 that predicts future transmit power levels that will be specified by a wireless communication system. These predictions may be used by the condition checking module 230 to predict whether transmission power management conditions 240 are likely to be violated in the future. Some transmission power management conditions 240 may also incorporate such predicted transmit power levels. For example, violation of some power management conditions 240 may be contingent upon particular transmit power level predictions. For example, if the user device determines that a maximum accumulated transmit power level will be reached in the near future, power throttling may begin for current transmissions to prevent such an occurrence.

In one embodiment, the power throttling module 235 reduces a transmit power level used to transmit data to the wireless carrier system by changing the power class when one or more transmit power management conditions 240 have been violated. In another embodiment, the power throttling module 236 can be used to change a multi-slot class to a multi-slot class with a reduced number of transmit slots per frame. The power throttling module 235 may also reduce the transmit power level below a specified transmit power level incrementally by incrementally transitioning to lower power classes or by incrementally reducing the specified transmit power levels. In one embodiment, a suitable transmit power level is an output level that will not cause any of the transmission power management conditions to be violated. Alternatively, a suitable transmit power level may be a level that will cause the transmission power management condition to stop being violated at some point in the future. For example, a suitable transmit power level may cause a trend towards eventual compliance with the violated transmission power management conditions 240.

Alternatively, the power throttling module 235 may compute or otherwise identify a suitable transmit power level, and reduce the current transmit power level to the suitable transmit power level in a single action. For example, a transmit power management condition 240 may specify that when the human body part proximity condition or the user interaction condition is violated, and the transmit power level should be reduced by a specified amount. Alternatively, the transmit power level may be adjusted incrementally until the current transmit power level is at a suitable level.

Power throttling module 235 may also reduce a duty cycle for the transmissions (e.g., space out the transmissions over time). Therefore, the power throttling module may adjust both the transmit power levels used for transmission via the declared power classes, for example, and the frequency of those transmissions.

In one embodiment, transmitting module 215 transmits data to a wireless communication system or additional user device at either a specified transmit power level (e.g., as specified by the wireless communication system) or at a transmit power level determined by the power throttling module 235. In another embodiment, transmitting module 215 transmits data to a wireless communication system or additional user device with either a specified transmit power level (e.g., as specified by the wireless communication system) or with a new transmit power level as determined by the power throttling module 235. The transmitting module 215 may transmit the data through one or more antennas included in the user device.

In one embodiment, the condition checking module 230 maintains a transmit power level log 245 associated with transmit power levels of a particular antenna (or radio). In another embodiment, the condition checking module 230 maintains a transmit power level log 245 associated with transmit power levels of all antennas of the user device. Alternatively, the condition checking module 230 may maintain separate transmit power level logs for each antenna. The transmit power level log or logs 245 are records of past transmit power levels that have been used (e.g., in a defined sample period). The sample period may be, for example, 5 seconds, 10 seconds, 1 minute, 10 minutes, and so on. For some power management conditions 240, such as the maximum accumulated transmit power level, the transmit power level log 245 is used to determine whether the power management condition 240 has been or will be violated.

In one embodiment, the polling module 236 is used to manage polling of a current transmit power of the user device 104. The polling module 236 may receive an indication from the condition checking module 230 that a presence of a human body part has been detected. In response, the polling module 236 starts polling at a first polling rate by starting a polling time. At each polling instance, the polling module 236 determines whether a current transmit power exceeds a transmit power threshold. It should be noted that the term "exceeds" as used herein means that the current transmit power is equal to or greater than a specified transmit power threshold or that the current transmit power is greater than the specified transmit power threshold. The polling continues until the current transmit power is above the transmit power threshold at one of the polling instances. Once above the transmit power threshold, the polling module 236 adjusts the first polling rate to a second polling rate and polls the current transmit power at the second polling rate. If after adjusting to the second polling rate the polling module 236 determines that the current transmit power still exceeds the transmit power threshold at a subsequent polling instance, the polling module 236 reduces the specified transmit power level by a first specified amount to a second transmit power level. This may be done by the polling module 236 instructing the power throttling module 235 to reduce the power by the specified amount. The power throttling module 235 can instruct the transmitting module 215 to transmit the data at the second, reduced transmit power level.

In another embodiment, the polling module 236 can resume the polling at the second polling rate if at the subsequent polling instance the current transmit power still exceeds the transmit power threshold. In another embodiment, the polling module 236 can resume the polling, but at the first polling rate. If the current transmit power still exceeds the transmit power threshold at another subsequent polling instance, the polling module 236 can reduce the second transmit power level by a second specified amount to a third transmit power level. For example, the polling module 236 can incrementally adjust the transmit power levels. The polling module 236, via the power throttling module 235, instructs the transmitting module 215 to transmit the data at the third transmit power level. In another embodiment, if at the other subsequent polling instance, the current transmit power still exceeds the transmit power threshold, the polling module 236 adjust the polling to a third polling rate.

In another embodiment, while polling, the polling module 236 may receive indication that the user device no longer detects the presence of the human body part. For example, the user device 104 detects an absence of the human body part after detecting the presence of the human body part. In response to detection of the absence of the human body part, the polling module 236 restores the power level to the specified transmit power level from either the second or third transmit power level. Also, in response to detection of the absence, the polling module 236 can stop polling the current transmit power. Also, once the polling module 236 receives indication of a presence of a human body part, the polling module 236 can continue polling the current transmit power at the first polling rate until the current transmit power exceeds the transmit power threshold. This allows for a delay of power throttling until the current transmit power exceeds the threshold.

In one embodiment, the first polling rate, the second polling rate, the transmit power threshold, and the first specified amount are programmable values. These values may be stored in volatile or non-volatile memory of the user device.

Figure 3:
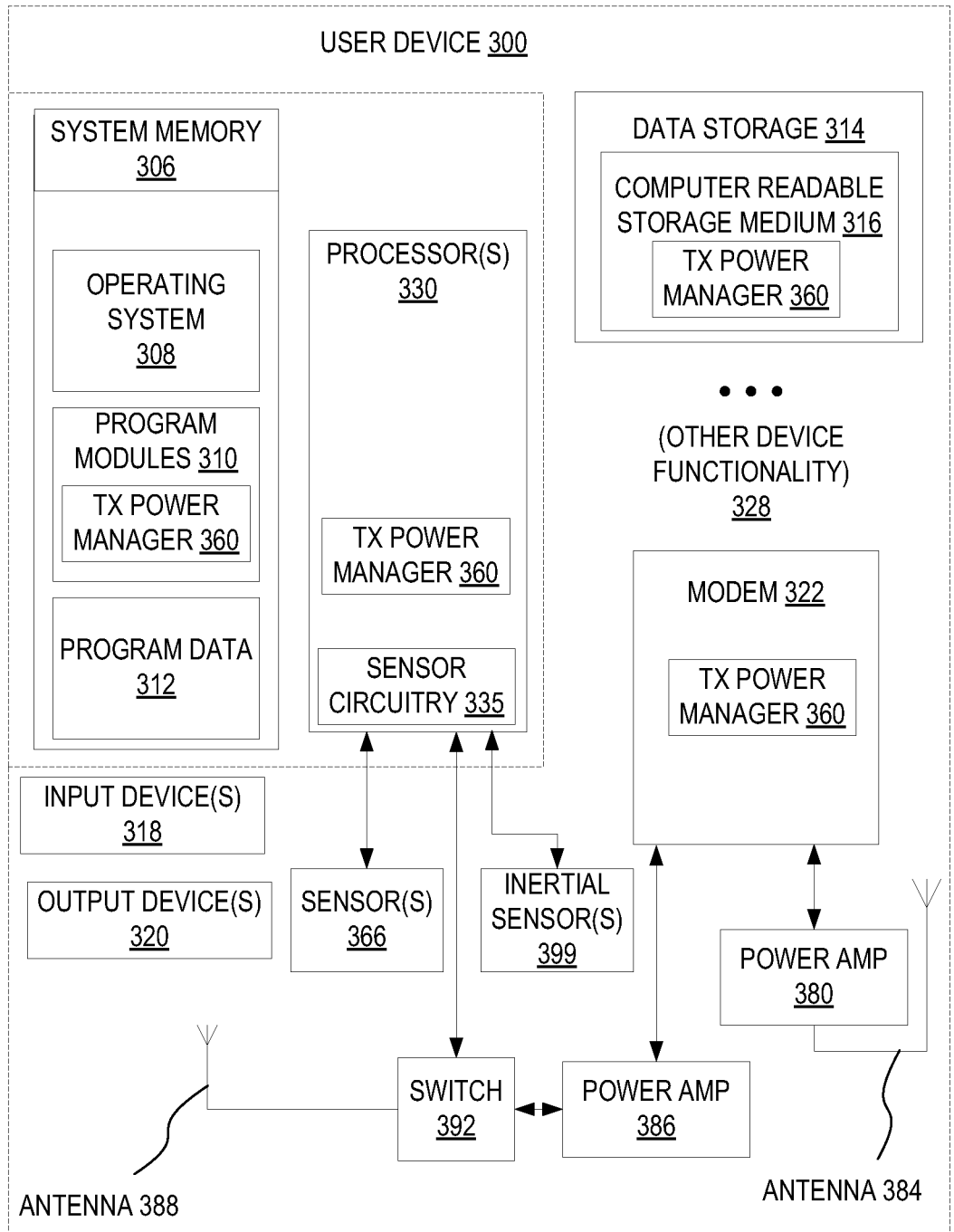
FIG. 3 is a block diagram illustrating one embodiment of an exemplary user device.

FIG. 3 is a block diagram illustrating an exemplary user device 300. The user device 300 may correspond to the user device 104 of FIG. 1 and may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like.

The user device 300 includes one or more processors 330, such as one or more CPUs, microcontrollers, field programmable gate arrays, or other types of processors. The user device 300 also includes system memory 306, which may correspond to any combination of volatile and/or non-volatile storage mechanisms. The system memory 306 stores information which provides an operating system component 308, various program modules 310 such as transmit (TX) power manager 360, program data 312, and/or other components. The user device 300 performs functions by using the processor(s) 330 to execute instructions provided by the system memory 306.

The user device 300 also includes a data storage device 314 that may be composed of one or more types of removable storage and/or one or more types of non-removable storage. The data storage device 314 includes a computer-readable storage medium 316 on which is stored one or more sets of instructions embodying any one or more of the methodologies or functions described herein. As shown, instructions for the transmit power manager 360 may reside, completely or at least partially, within the computer readable storage medium 316, system memory 306 and/or within the processor(s) 330 during execution thereof by the user device 300, the system memory 306 and the processor(s) 330 also constituting computer-readable media. The user device 300 may also include one or more input devices 318 (keyboard, mouse device, specialized selection keys, etc.) and one or more output devices 320 (displays, printers, audio output mechanisms, etc.).

The user device 300 further includes a wireless modem 322 to allow the user device 300 to communicate via a wireless network (e.g., such as provided by the wireless communication system) with other computing devices, such as remote computers, the item providing system, and so forth. The wireless modem 322 allows the user device 300 to handle both voice and non-voice communications (such as communications for text messages, multimedia messages, media downloads, web browsing, etc.) with the wireless communication system 110. The wireless modem 322 may provide network connectivity using any type of mobile network technology including, for example, cellular digital packet data (CDPD), GPRS, EDGE, universal mobile telecommunications system (UMTS), 1 times radio transmission technology (1xRTT), evaluation data optimized (EVDO), high-speed down-link packet access (HSDPA), WiFi, Long Term Evolution (LTE) and LTE Advanced (sometimes generally referred to as 4G), etc. In one embodiment, the wireless modem includes the transmit power manager 360 in addition to, or instead of, the transmit power manager 360 being included in the computer readable storage medium 316, system memory 306 and/or processor(s) 330. The transmit power manager 360 may be implemented as hardware, firmware and/or software of the wireless modem 322. It should be noted that the modem 322 may include a processing component that performs various operations to handle both voice and non-voice communications. This processing component can execute the transmit power manager 360. Alternatively, the transmit power manager 360 can be executed by a processing component of the user device, such as the processor 330 or other types of processing device as would be appreciated by one of ordinary skill in the art having the benefit of this disclosure.

The wireless modem 322 may generate signals and send these signals to power amplifier (amp) 380 or power amp 386 for amplification, after which they are wirelessly transmitted via antenna 384 or antenna 388, respectively. Antenna 384 and 388 may be configured to transmit in different frequency bands and/or using different wireless communication protocols. The antennas 384, 388 may be directional, omnidirectional or non-directional antennas. In addition to sending data, antennas 384, 388 also receive data, which is sent to wireless modem 322 and transferred to processor(s) 330.

Though a single modem 322 is shown to control transmission to both antennas 384 and 388, the user device 300 may alternatively include multiple wireless modems, each of which is configured to transmit data via a different antenna and/or wireless transmission protocol. In one embodiment, each modem includes an independent transmit power manager. Alternatively, a single transmit power manager (e.g., that is included in system memory 306, processor 330 and/or data storage 314) may control transmit power levels used by each wireless modem. In addition, the user device 300, while illustrated with two antennas 384, 388, may include more or fewer antennas in various embodiments.

In one embodiment, user device 300 includes one or more sensors 366 such as a physical contact sensor or close proximity sensors. The sensors 366 can detect the presence of human body parts, and convey information regarding the detected presence to processor(s) 330. In one embodiment, the sensors 366 may be capacitive sensors that are configured to measure capacitance generated by the presence of the human body part using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 366 may also be optical (e.g., infrared) sensors that use an emitter and receiver pair to detect the presence of opaque objects. Alternatively, the sensors 366 may be inductive sensors, which include an inductive loop. When the presence of a human body part (or metal object) is brought close to the inductive sensor, an induction of the inductive loop changes, causing the human body part to be detected. Alternatively, the sensors 366 may be ultrasonic sensors that emit an ultrasonic signal and measure a time duration between when a signal is transmitted and the reflection of that signal received (a.k.a., flight response). The sensors 366 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. Though the detected object is described herein as a human body part, other types of objects may also be detected depending on the sensing technologies used. It should also be noted that detecting a presence of an object proximate to the user device means that the object may be touching the user device or may be in proximity to the user device.

In one embodiment, user device 300 includes one or more inertial sensors 399. The inertial sensors 399 can be used to detect motion of the user device 300. In one embodiment, the inertial sensors 399 detect linear accelerations (translational movement) and angular accelerations (rotational movement). The inertial sensors 399 may include accelerometers and/or gyroscopes. Gyroscopes use principals of angular momentum to detect changes in orientation (e.g., changes in pitch, roll and twist). Accelerometers measure accelerations along one or more axes (e.g., translational changes). The gyroscope and accelerometer may be separate sensors, or may be combined into a single sensor. The inertial sensors 399 in one embodiment are micro-electromechanical systems (MEMS) sensors.

The processor(s) 330 may include sensor circuitry 335 (e.g., sensor device drivers) that enables the processor(s) 330 to interpret signals received from the sensor(s) 366 and/or inertial sensors 399. In one embodiment, the sensors 366 and/or inertial sensors 399 output fully processed signals to the processor(s) 330. For example, the sensors 366 may output a distance, a detected/not detected signal, etc. using a single line interface or a multi-line interface. Similarly, inertial sensors 399 may output an acceleration value (e.g., in Gs). In another embodiment, the sensors 366 output, for example, positional data and/or object presence data (e.g., of a human body part) to the processors 330 without first processing the data. Similarly, inertial sensors 399 may output, for example, voltage values that can be interpreted as acceleration values. In either instance, the processors 330 may use the sensor circuitry 335 to process and/or interpret the received data. If data is received from multiple sensors 366 and/or inertial sensors 399, processing the data may include averaging the data, identifying a maximum from the data, or otherwise combining the data from the multiple sensors. In one embodiment, in which the sensors 366 include a sensor array, numerous sensors, or a touch panel, processing the data includes determining where on the user device the human body part is located from multiple sensor readings.

In one embodiment, antenna 388 is used as a proximity sensor (e.g., as a sensor electrode for a proximity sensor). To enable the use of antenna 388 as a proximity sensor, a switch 392 disconnects the antenna 388 from power amp 386 (and thus from modem 322), and connects antenna 388 to sensor circuitry 335 and/or to a proximity sensor integrated circuit (not shown) that connects to sensor circuitry 335. While there is an electrical connection between sensor circuitry 335 and antenna 388, the antenna 388 provides signals to sensor circuitry 335. The sensor circuitry 335 processes the signals to determine whether the presence of a human body part is detected. While there is an electrical connection between antenna 388 and power amp 386, antenna 388 may be used to transmit and receive information (e.g., to maintain a wireless connection). In one embodiment, by default the switch 392 maintains an electrical connection between power amp 386 and antenna 388.

In one embodiment, processor 330 controls whether the switch 392 provides an electrical connection between the sensor circuitry 335 and the antenna 388 or between the power amp 386 and the antenna 388. Alternatively, or in addition, modem 322 may control switch 392. Switch 392 may provide an electrical connection between sensor circuitry 335 and antenna 388 on a periodic or other basis (e.g., every 500 ms or ever 1 s). The electrical connection between the sensor circuitry 335 and the antenna 388 may then be sustained for a predetermined time period (e.g., 100 ms), after which the electrical connection between the antenna 388 and sensor circuitry 335 is terminated, and an electrical connection between the power amp 386 and the antenna 388 is established. In one embodiment, the user device determines when antenna 388 will not be sending or receiving data, at which point switch 392 establishes an electrical connection between antenna 388 and sensor circuitry 335.

Note that an additional switch (not shown) may be interposed between power amp 380 and antenna 384, which may function in the manner described above with reference to switch 392. The additional switch may have connections to sensor circuitry 335 and processor 330 as shown for switch 392.

Figure 4:
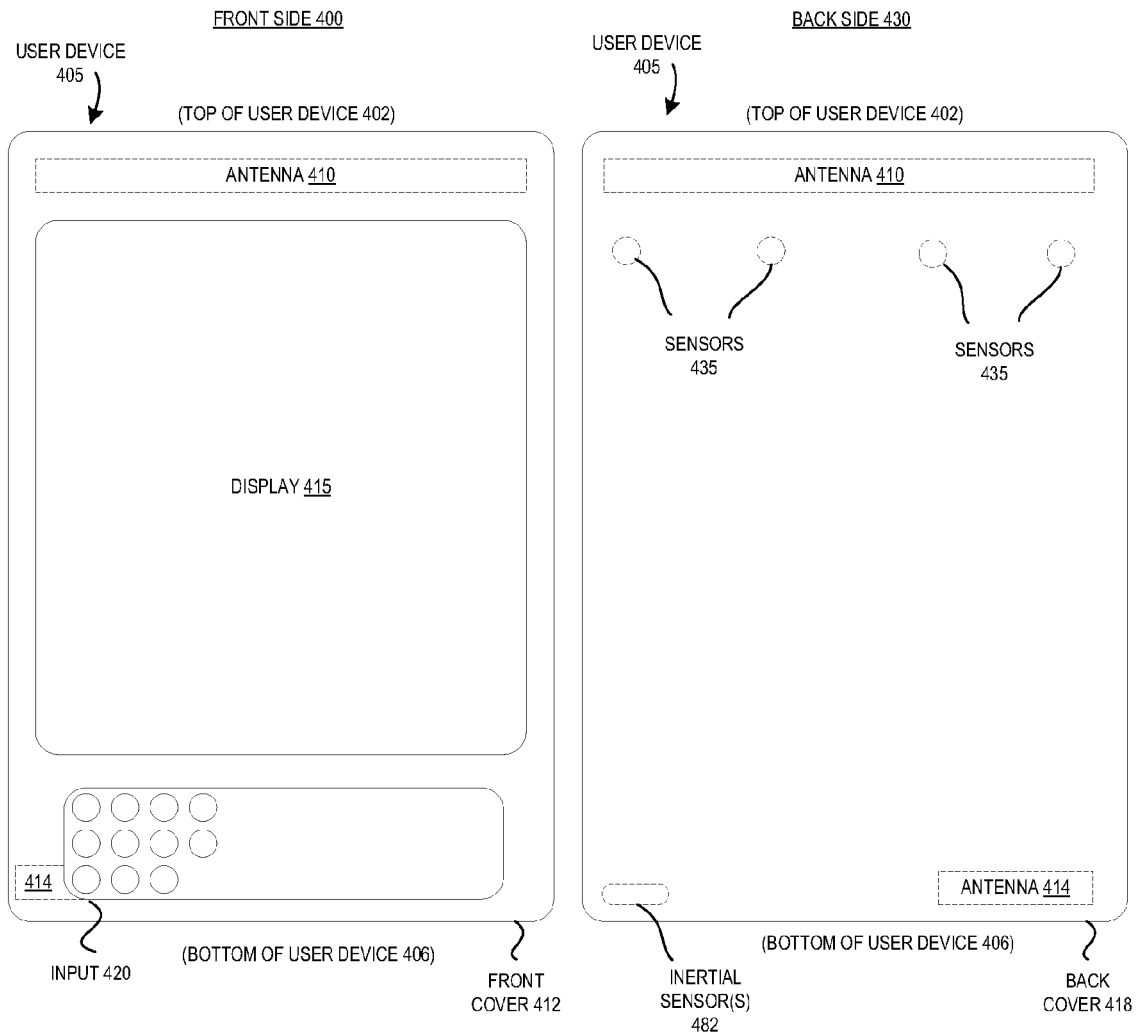
FIG. 4 illustrates an example of a front side and back side of a user device.

FIG. 4 illustrates an example of a front side 400 and back side 430 of a user device 405. The front side 400 includes a display 415 and optionally an input 420 housed in a front cover 412. The display 415 may use any available display technology, such as electronic ink (e-ink), liquid crystal display (LCD), transflective LCD, light emitting diodes (LED), laser phosphor displays (LSP), and so forth. The input 420 may include a keyboard, touch pad, or other input mechanism. In one embodiment, the display 415 and input 420 are combined into one or more touch screens.

Disposed inside the user device 405 is an antenna 410, an antenna 414, one or more sensors 435 and one or more inertial sensors 482. Note that, in some embodiments, the user device 405 may not include sensors 435, and, in other embodiments, the user device 405 may not include inertial sensors 482. As shown, the antenna 410 is positioned near a top 402 of the user device 405 and the antenna 414 is positioned near a bottom 406 of the user device 406. However, the antennas 410 and 414 may also be positioned at other locations, such as at a side of the user device 405 or near the bottom 406 of the user device 405. In one embodiment, the antennas 410, 414 are positioned less than approximately 15 cm apart, which is the distance at which interference is typically introduced between antennas in user devices such as mobile phones. Such minimal separation between the antennas can be achieved without interference problems in one embodiment of the present invention due to a fine grained control of transmit power levels provided by the transmit power manager 135. Alternatively, the user device 405 may include a single antenna or may include more than two antennas as illustrated in FIG. 4.

Disposed at a back side of the user device 405 are one or more sensors 435. The sensors 435 may be proximity sensors such as inductive sensors, capacitive sensors, magnetic sensors, infrared sensors, ultrasonic sensors, or the like. The sensors 435 may also be touch sensors such as a resistive touch sensor, a capacitive touch sensor, a mechanical touch sensor (e.g., a mechanical button), or the like. FIG. 4 illustrates four sensors 435, but more or less sensors 435 may be used. Similarly, FIG. 4 illustrates one inertial sensor 482, but more than one inertial sensor 482 may be used.

The one or more inertial sensors 482 may have fixed positions within the user device 405. The inertial sensors 482 may include gyroscope and/or accelerometer (e.g., a 3 axis accelerometer). The gyroscope and accelerometer may be separate sensors, or may be combined into a single sensor.

The antenna 410, antenna 414, sensors 435, and inertial sensors 482 are shown in the illustrated embodiment using dashed lines to indicate that these components are not on a surface of the user device 402 (e.g., that they are inside a back cover 418). However, in alternative embodiments these components may be on a surface of the user device 405.

Note that in one embodiment the sensors 435 are disposed proximate to the antenna 410 to detect when a human body part is close to the antenna 410. This may include detecting a distance between the antenna 410 and the human body part. The sensors 435 may be disposed in an approximately linear pattern as shown in FIG. 4. Alternatively, the sensors 435 may be disposed in other patterns at the back side of the user device 405. Such additional patterns may include a square pattern, an elliptical pattern, a checkerboard pattern, or other pattern. The sensors 435 may be discrete sensors (as shown), or may be linear sensor arrays, other sensor arrays, a touch panel, slider sensors, or the like. The sensors 435 may also be a single proximity. For example, a single proximity sensor may be included that is substantially equal to the size of the entire back 418 of the user device 405. As shown, the sensors 435 are disposed between the antenna 410 and the bottom 406 of the user device 405. However, one or more sensors 435 may also be disposed at other locations with relation to the antenna 410, such as between the antenna 410 and the top 402 of the user device 405. Similarly, additional sensors 435 may be disposed near the antenna 414 (not illustrated). Though sensors 435 are shown only at the back side 430 of the user device 405, the front side 400 of the user device 405 may also include other sensors. In one embodiment, as described above with reference to FIG. 3, one or both of antenna 410 and antenna 414 may function as proximity sensors. In such an embodiment, some or all of sensors 435 may be omitted. When a human body part is detected near an antenna, the transmit power level for that antenna may be throttled, including reducing the number of transmit slots per frame for data transmission. Alternatively, the transmit power levels for both antennas may be throttled, including reducing the number of transmit slots per frame for data transmission, when any sensor 535 detects the presence of a human body part.

In one embodiment, the sensors 435 may be disposed on an underside of a non-conductive substrate, which may be a rigid substrate (e.g., a printed circuit board (PCB)) or a flexible substrate (e.g., a polyimide film, polyester film, or polyether ether ketone (PEEK) film). When multiple antennas 410, 414 are used, sensors 435 may be positioned proximate to each antenna 410, 420. Alternatively, when the user device includes a single antenna the sensor 435 may be positioned proximate to the single antenna. In one embodiment, the sensors 435 are located 10 mm from the antenna 410. Alternatively, the sensors may be disposed at different locations, and may even be disposed gradually further away from the antenna 410, such as one sensor at 10 mm, another at 15 mm, another at 20 mm, and another at 25 mm, for example. Depending on which of sensors detect the presence of a human body part and/or relative strengths of detection signals generated by the sensors, a distance between the human body part and antenna may be determined.

The sensor 435 may also be disposed on inside of the back cover 418. In other embodiments, the sensors 435 may alternatively be positioned within the back cover 418 such that they are flush with the outer perimeter of the back cover 418, protrude outside of the back cover 418, or recede within the back cover 418. Some sensors 435 may also be attached to a front of the non-conductive substrate (e.g., a printed circuit board (PCB)) or to an inside of the front cover 412. The substrate may be a rigid substrate (e.g. PCB) or a flexible substrate (polyimide, polyester, polyether ether ketone, etc). The substrate may also have mounted thereon a sensor integrated circuit electrically connected to the sensors. The sensors may be spot sensors that have small sensing elements with a limited sensing range. The sensors may be strip sensor that have large sensing elements that are table to detect the proximity of a human body part across a large area, such as along a back right or left side of the user device (or a top or bottom side). In one embodiment, in which the strip sensor is a linear array of sensors or a slider sensor, the strip sensor is capable of identifying where the human body part, such as a hand, is positioned along the strip (e.g., nearer antenna 410 or antenna 414).

Inertial sensors 482 may be attached to an inside of the front cover 412 or back cover 418, attached to a top side or bottom side of a non-conductive substrate, or attached to some other component of the user device 405. Additionally, inertial sensors 482 may be positioned at a top, bottom, middle, side, or other location on the user device 405.

In one embodiment, a user's hand or leg may be in contact with the back side 418 of the user device 405. During transmission of data, antenna 410 emits a radio frequency (RF) field that may be absorbed by the portions of the human body (e.g., by the hand and/or leg). The amount of electromagnetic radiation that may be absorbed from the RF field by the portions of the human body are based on a distance of the human body part from the antenna 410. The power of the RF field drops off at a rate of $1/d^2$, where d is distance from the antenna 410. Accordingly, the closer a human body part is to the antenna 410, the more radiation that may be absorbed. The different body parts may absorb different amounts of radiation, and the sensors 435 may be used to determine which antenna needs to be reduced. For example, the leg may only absorb a nominal amount of radiation from the RF field because of the distance between the antenna 410 and the leg. However, the hand may be close enough to the antenna 410 to possibly absorb elevated amounts of radiation. In this case, if the hand were positioned over one of sensors 435, the sensors 435 detect the presence of the hand. In some embodiments, depending on the sensor type, the sensors may detect the presence of a human body part even if the human body part is not in direct contact with the sensor 435 or not positioned directly over the sensor 435. For example, capacitive sensors, inductive sensors, optical sensors, ultrasonic sensors and the like may detect objects that are proximate to, but not touching, the sensors. If sensors 435 are positioned across the entire back side 418 (e.g., in a sensor array), then signals from multiple sensors can be processed to visualize a size, shape and/or position of a detected object. This may enable the user device 405 to identify whether a detected object is a human body part, as well as a distance between the human body part and the antenna 410. If the antenna 410 acts as a sensor, it may be sensitive enough to detect the proximity of hand and/or leg, for example.

Upon detection of the hand, the user device 405 may throttle an output power level used to transmit data via the antenna 410, may restrict transmission of data entirely, or may reduce a number of transmit slots per frame used for data transmission. Such throttling or restriction may remain in place until the hand is no longer detected, at which time normal output power levels may be used for the transmission of data. Embodiments of power throttling are discussed in greater detail below with reference to FIGS. 6-8.

Figure 5:
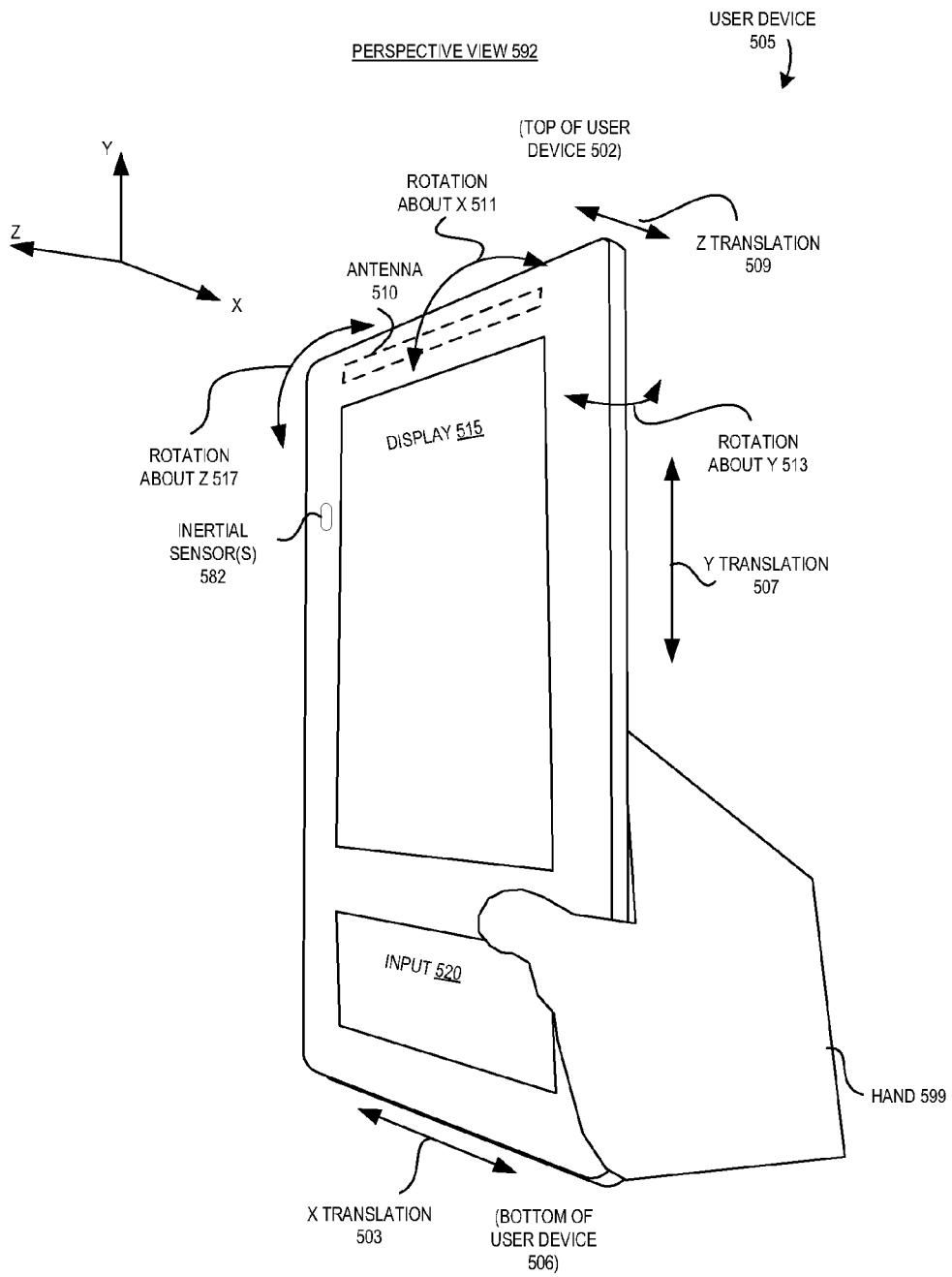
FIG. 5 illustrates a perspective view of a user device held in the hand of a user.

FIG. 5 illustrates a perspective view 592 of a user device 505 held in the hand of a user. As the user holds the user device 505, the user's hand 599 is not perfectly still. For example, the user's hand 599 may shake or otherwise move linearly in one or more directions (e.g., in an X direction, Y direction and/or Z direction). This linear (translational) motion may be registered by the inertial sensors 582 as linear acceleration in the X direction 503, linear acceleration in the Y direction 507 and linear acceleration in the Z direction 509. The user's hand 599 may also exhibit angular motion (e.g., about the X-axis, about the Y-axis and/or about the Z-axis). This motion may be registered by the inertial sensors as a rotation (or angular acceleration) about the Y-axis 513 (changes in roll), rotation (or angular acceleration) about the X-axis 511 (changes in pitch) and rotation (or angular acceleration) about the Z-axis 517 (changes in yaw). These detected motions may be used by the user device 505 to detect the presence of the hand 599 (or other human body part).

In one embodiment, the inertial sensors 582 gather motion data over a sample period, and compare the motion data to human body part presence criteria. The human body part presence criteria may include linear acceleration thresholds and/or angular acceleration thresholds. If the human body part presence criteria are satisfied (e.g., linear accelerations are above a linear acceleration threshold and angular accelerations are above an angular acceleration threshold), the user device 505 may determine that the presence of a human body part is detected. Upon such a determination, a transmit power management condition may be satisfied, and the user device 505 may throttle an output power level used to transmit data via the antenna 510 by transitioning the power class or multi-slot class or by reducing the as described herein, or may restrict transmission of data entirely. In another embodiment, the user device 505 may reduce the number of transmit slots per frame for data transmission, as described herein. Such throttling or restriction may remain in place until the presence of the human body part is no longer detected, at which time normal output power levels may be used for the transmission of data. Embodiments of power throttling are discussed in greater detail below with reference to FIGS. 6-8.

In one embodiment, the user device 505 determines whether the presence of a human body part is detected (e.g., whether the user device is held in a hand or resting on a leg) based on a combination of data from sensors 535 and from inertial sensors 582. For example, capacitive sensors may falsely detect the presence of a human body part when the user device 505 is resting on a metal surface. However, while the user device 505 is resting on the metal surface, the inertial sensors 582 would not detect the presence of a human body part. Similarly, inertial sensor 582 may falsely detect the presence of a human body part when the user device is in a moving vehicle, such as a car, train, bus, airplane, boat, etc., due to motions of the vehicle. However, while the user device is resting in the moving vehicle, sensors 535 may indicate that no presence of a human body part is detected. Thus, accuracy of detecting the presence of a human body part may be increased by using both the sensors 535 and inertial sensors 582.

The linear accelerations and angular accelerations detected by the inertial sensors 582 may differ depending on where a user is holding the user device 505. For example, when the user's hand 599 is holding the user device 505 near a bottom of the user device 506, inertial sensors 582 may detect first angular accelerations and linear accelerations, and when the user's hand 599 is holding the user device 505 near a top of the user device 502, inertial sensors 582 may detect second angular accelerations and linear accelerations. In one embodiment, if the inertial sensors 582 are near a top of the user device 502, then the first linear and angular accelerations may have greater magnitudes than the second linear and angular accelerations.

In one embodiment, when the presence of a human body part is detected, user device 505 uses motion data from the inertial sensors 582 to determine whether the human body part is near the bottom 506 of the user device or near the top 502 of the user device. If the human body part is near the top of the user device 502 (near antenna 510), transmit power throttling may be initiated. However, if the human body part is near the bottom of the user device 506, no transmit power throttling may be implemented.

For example, in one embodiment, when the user device 505 is resting against a leg of a user, the user's leg may be relatively motionless. Accordingly, the inertial sensors 582 may not detect motion of the user device 505 sufficient to identify the presence of a human body part when the user device 505 is resting against a user's leg. However, it has been observed that the user device 505, when tilted at particular angles, has a high probability of being held by a user.

Accordingly, in one embodiment the inertial sensors 582 are used to determine an angle of the user device 505 with respect to gravity. Gravity exerts a downward force that is measured by the inertial sensors 582 as acceleration. When the user device 505 is relatively motionless, the acceleration caused by gravity may be identified, and the angle of the user device 505 with respect to gravity may be determined. In one embodiment, if the angle with respect to gravity has a value that is less than a threshold angle (e.g., 80 degrees), the presence of a human body part is detected. Alternatively, the angle may be defined as an angle relative to horizontal (a plane normal to gravity), and the presence of a human body part may be detected when the angle with respect to horizontal is greater than a threshold value (e.g., greater than 10 degrees). Thus, the presence of a human body part may be detected using the inertial sensors 582 even when the user device 505 is motionless.

Figure 6:
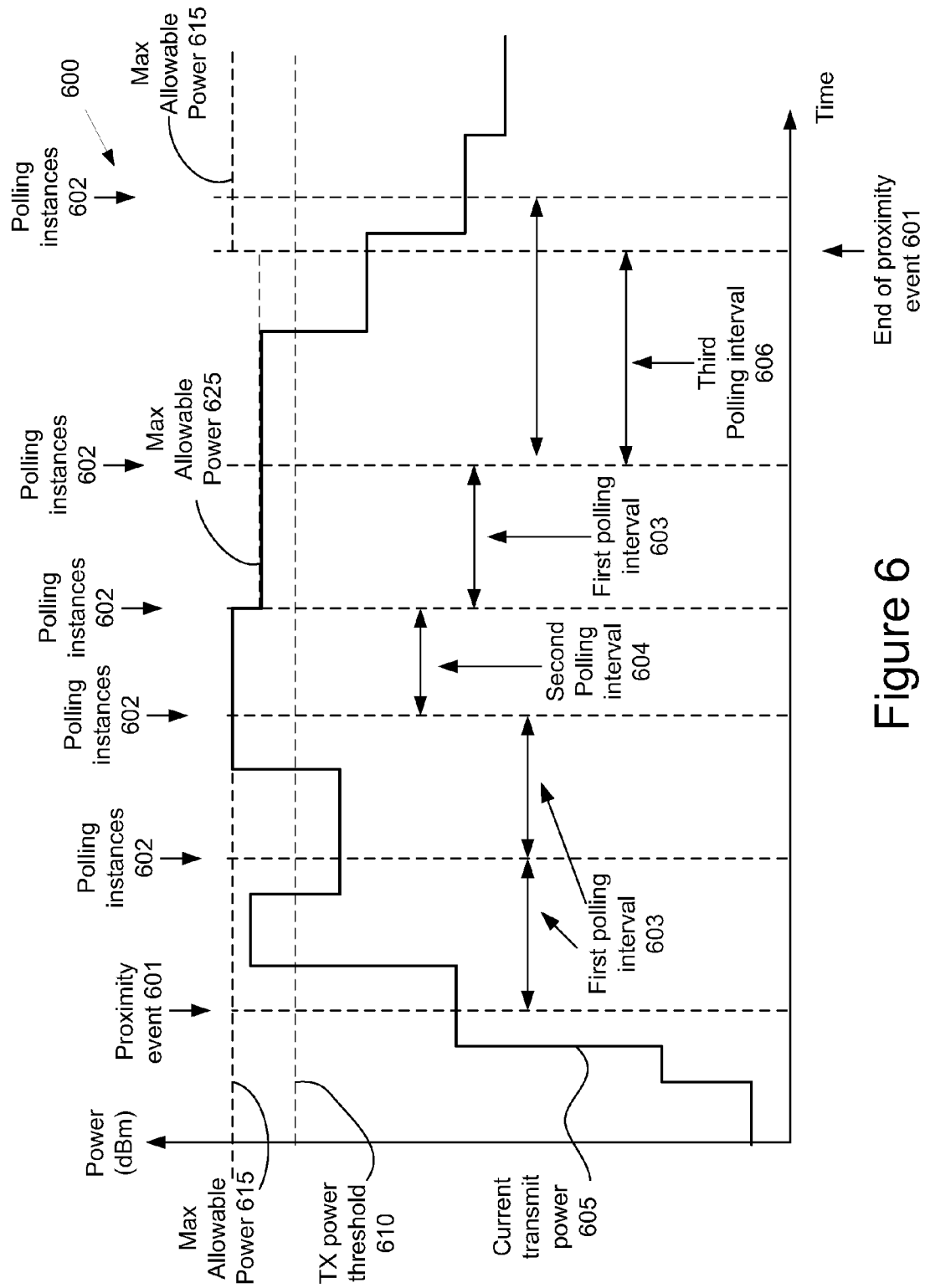
FIG. 6 is a flow diagram of an embodiment of a timing diagram of a power throttling algorithm of a power manager.

FIG. 6 is a flow diagram of an embodiment of a timing diagram of a power throttling algorithm of a power manager (135 or 200). In this embodiment, the power throttling algorithm is triggered by detection of a proximity event 601, such as an alert from the proximity sensor. In response, the power throttling algorithm begins polling current transmit power 605 at a rate specified by the user (POLL_INT). In one embodiment, the polling interval value POLL_INT may be read from non-volatile memory and used by the polling module 136 or 236 to start the polling. At each polling instance 602, the power throttling algorithm compares the current transmit power 605 to a transmit power threshold 610. The power transmit power threshold 610 may be an appropriate threshold for a particular technology. For example, the transmit power thresholds for GSM and WCDMA may be specified as different transmit power thresholds in non-volatile memory. These values may be specified by the user, administrator, developer, or the like. If the data is being transmitted using GSM technology, the power throttling algorithm uses the appropriate transmit power threshold 610 for GSM. If the current transmit power 605 exceeds the transmit power threshold 610, the polling rate may be adjusted. For example, a second polling timer may be started that expires after a specified amount of time (e.g., TIME_STEP). This value may also be stored in non-volatile memory. As shown in FIG. 6 at the first polling instance 602 at the end of the first polling interval 603, the current transmit power 605 does not exceed the transmit power threshold 610, although the current transmit power 605 did exceed earlier before the polling instance 602. Thus, the power throttling algorithm continues to poll at the first polling rate. At the second polling instance 602 at the end of the first polling interval 603, the current transmit power 605 exceeds the transmit power threshold 610. When the current transmit power 605 exceeds the transmit power threshold 610 at one of the polling instances 602, the power throttling algorithm starts a second timer by adjusting the first polling rate to a second polling rate. In this embodiment, the second polling rate is faster than the first polling rate, but in other embodiments, the adjustment of the polling rates could be faster or slower. In one embodiment, the second polling rate is set by reading a specified amount of time (e.g., TIME_STEP) from non-volatile memory. At the end of the second polling interval 604 (i.e., expiration of the timer at the third polling instance 602), the power throttling algorithm determines that the current transmit power 605 still exceeds the transmit power threshold 610. In response, the power throttling algorithm reduces the maximum allowable power 615 (also referred to herein as specified transmit power level) to a second maximum allowable power 625 by a specified amount (e.g., PWR_STEP). This value may also be stored in non-volatile memory. The power throttling algorithm continues to poll at regular polling rate (first polling rate). Alternatively, the power throttling algorithm can continue polling at the second polling rate or even a third polling rate that is greater than or less than the first polling rate as would be appreciated by one of ordinary skill in the art having the benefit of this disclosure. If at the next polling instance 602 (fourth polling instance in FIG. 6) the current transmit power 605 is still above transmit power threshold 610, the power throttling algorithm starts a third timer by adjusting the first polling rate to a third polling rate. In this embodiment, the third polling rate is slower than the first polling rate and the second polling rate, but in other embodiments, the adjustment of the polling rates could be faster or slower as would be appreciated by one of ordinary skill in the art having the benefit of this disclosure. In one embodiment, the third polling rate is set by reading a specified amount of time (e.g., next TIME_STEP) from non-volatile memory. In one embodiment, the four step times can be used. This allows the maximum allowable power 615 to be incrementally decreased over time to ensure that the user device complies with SAR requirements while minimizing any negative effect on user experience. The polling pattern can continue until the current transmit power 605 has been reduced below the transmit power threshold 610. Alternatively, as shown in FIG. 6, the polling can continue until the end of the proximity event 601, at which point the power throttling algorithm can increase the maximum allowable power 625 to the maximum allowable power 615 by the specified amount. If then end of the proximity event 601 were not to occur, the power throttling algorithm can restore the maximum allowable power 625 at a polling instance 602 where the current transmit power 605 no longer exceeds the transmit power threshold 610. In this embodiment, the maximum allowable power 625 would be restored at the end of the third polling interval 606 (i.e., expiration of the timer at the fifth polling instance 602).

In another embodiment, the wireless carrier may request that the user device transmit at a lower power. If at any polling instance 602 the current transmit power 605 is below the transmit power threshold 610, the power limit levels may be returned to their maximum values as specified by the wireless carrier.

In another embodiment, if the specified number of steps are exhausted and the current transmit power 605 still exceeds the transmit power threshold 610, the power throttling algorithm continues polling at the first polling rate (e.g., POLL_INT rate), but no power throttling is performed. Alternatively, the power throttling algorithm may perform other operations, such as alerting the user, turning off the antenna, or the like.

In one embodiment, at each polling instance 602, the current radio access technology (RAT) and band are checked against the previous RAT and band. If they are different, the power algorithm state may be reset. For example, the adjustments on timers, power throttling, etc, may be reset. This may help ensure that the specific power throttling parameters for that specific band are being used.

In another embodiment, at each polling instance 620, the power throttling algorithm checks the signal condition, such as measured in the respective device, such as signal to noise ratio (SNR), Ec/No, or other measurements indicative of the signal condition. For example, in user devices that use Universal Mobile Telecommunications System (UMTS) technology, a good or acceptable signal condition may be any signal level that is better than −12 dB. As signal conditions may be depend on the specific user device, the data rate, and the cellular technology being used, alternatively, other signal levels may be used as acceptable signal levels. For example, the signal level of −12 dB may be an acceptable signal level to facilitate voice communication, but other signal levels may be used for other types of communications, such as non-voice data, and signaling data to and from the wireless carrier that is used to facilitate voice and non-voice data communications. If this signal level is acceptable (i.e. the user device has a good signal), the power throttling algorithm can increase the polling interval. This feature may save computation time when the user device is located in an area where it is unlikely to be transmitting at a high power. Similarly, if the signal condition is poor, the power throttling algorithm may decrease the polling interval.

It should be noted that FIG. 6 illustrates a particular transmit power profile, but other transmit power profiles may be used as would be appreciated by one of ordinary skill in the art having the benefit of this disclosure.

Figure 7:
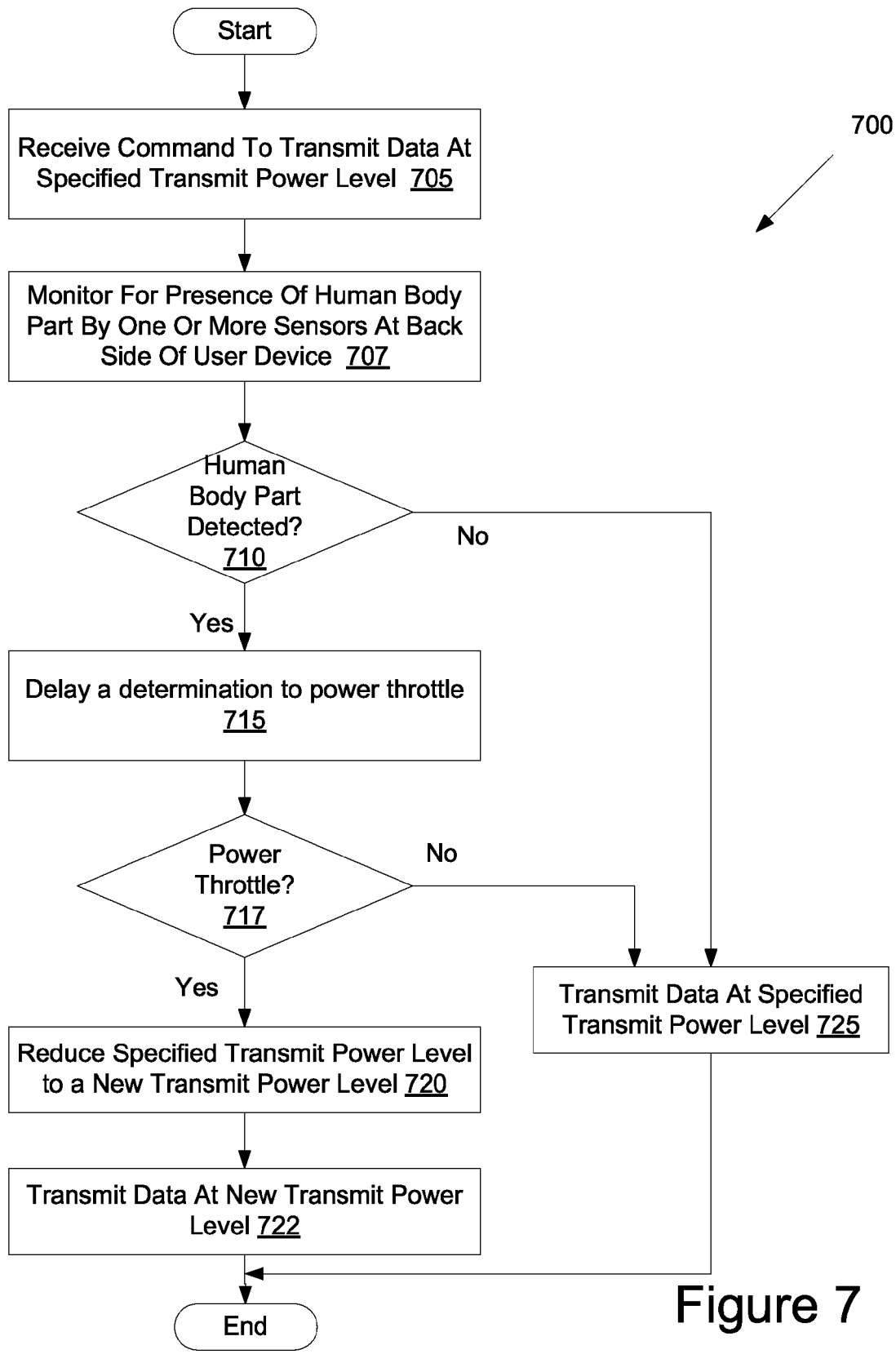
FIG. 7 is a flow diagram of an embodiment of a method for dynamic power throttling for data transmission in response to detecting a human body part.

FIG. 7 is a flow diagram of an embodiment of a method 700 for dynamic power throttling for data transmission in response to detecting a human body part. At block 705 of method 700, a command to transmit data at a specified transmit power level is received. The command may be received from a wireless carrier, a WiFi hotspot, or other wireless communications system, or may be received from another component of the user device or an application running on the user device (e.g., an application for creating a wireless ad hoc network).

The user device monitors for the presence of a human body part (block 707). In one embodiment, the user device monitors for the presence of the human body using one or more sensors disposed on or within the user device (block 707). Alternatively, other monitoring techniques may be used as described herein. At block 710, the user device determines whether a human body part has been detected proximate to the user device. In one embodiment, the user device determines whether the human body part has been detected within a predetermined distance from one or more antenna of the user device. If no human body part has been detected (or has been detected within the predetermined distance), the method proceeds to block 725 and the data is transmitted with the specified transmit power level. If a human body part has been detected within the predetermined distance, the method proceeds to block 715.

At block 715, the user device delays a determination to power throttle by a specified amount of time. At block 717, the user device determines whether to power threshold. If at block 717 the user device determines to power throttle, the user device adjust the specified transmit power level to a second transmit power level (block 720) and transmits the data at the new transmit power level (block 722). The user device may specify the amount to reduce the specified transmit power level or the new transmit power level itself. For example, the power manager can instruct the modem to the use the new transmit power level or to reduce the transmit power level by a specified amount. If at block 717, the user device determines that power throttling should not occur, the user device continues to block 725 and transmits the data at the specified transmit power level. The user device may additionally receive a command to transmit additional data using a different antenna than was used to transmit the original data. Such transmission of the additional data via the additional antenna may also be at a reduced transit power level.

In one embodiment, the user device transmits at a specified transmit power level. Upon detection of a presence of a human body part proximate to the user device, determines whether to adjust the specified transmit power level after delaying a specified amount of time. Instead of automatically power throttling upon a detection of the presence of the human body part, the method 700 can dynamically power throttle after a specified delay. In one embodiment, the user device delays the adjustment to a lower transmit power level by a specified amount of time, the specified amount of time being programmable. This allows the determination to power throttle to accommodate for spikes in the current transmit power of the user device, and allow for more flexibility in when the user device should throttle its power, for example, to reduce the effects of radiation absorption. In one embodiment, the delay of making the determination to adjust is delayed by polling the current transmit power upon a detection of a human body part. In other embodiments, the user device can detect a presence of other types of objects that absorb electromagnetic radiation, such as non-human body parts, and the user device can use the power throttling algorithm and power throttling techniques, as described herein, when the object is detected in order to reduce the SAR into the object as would be appreciated by one of ordinary skill in the art having the benefit of this disclosure.

In another embodiment, the user device delays the determination by starting a polling timer for the specified amount of time in response to the detection of the presence of the object. At an expiration of the polling timer, the user device checks whether a current transmit power exceeds a transmit power threshold. The specified transmit power level is adjusted to the second transmit power level when the current transmit power exceeds the transmit power threshold. In another embodiment, the user device delays the determination by starting a polling timer in response to the detection of the presence of the object. At an expiration of the polling timer, the user device checks whether a current transmit power exceeds a transmit power threshold. The user device also starts the polling timer again when the current transmit power does not exceed the transmit power threshold, and adjusts a duration of the polling timer when the current transmit power exceeds the transmit power threshold. In a further embodiment, the user device starts the polling timer with the adjusted duration, and at the expiration of the polling timer with the adjusted duration, the user device checks whether the current transmit power still exceeds the transmit power threshold. The specified transmit power level is adjusted to the second transmit power level when the current transmit power still exceeds the transmit power threshold. In this embodiment, the specified amount of time is an original duration of the polling time plus the adjusted duration of the polling time.

In another embodiment, the user device delays the determination by polling a current transmit power at a first polling rate in response to the detection of the presence of the object. At each polling instance, the user device determines whether the current transmit power exceeds a transmit power threshold, and adjust the first polling rate to a second polling rate when the current transmit power exceeds the transmit power threshold. In one embodiment, the second polling rate is greater than the first polling rate. In another embodiment, the second polling rate is greater than the third polling rate. In another embodiment, the user device reduces the specified transmit power level by a first specified amount to the second transmit power level when the current transmit power exceeds the transmit power threshold at a specified number of consecutive polling instances. In this embodiment, the first specified amount and the specified number of consecutive polling instances are programmable.

In another embodiment, the user device adjusts the second polling rate to a third polling rate after said reducing the specified transmit power level to the second transmit power level by the first specified amount. In another embodiment, the user device reduces the second transmit power level by a second specified amount to a third transmit power level when the current transmit power still exceeds the transmit power threshold after the specified number of consecutive polling instances. In this embodiment, the second specified amount is programmable.

In another embodiment, the user device reduces the specified transmit power level by a first specified amount to the second transmit power level when the current transmit power exceeds the transmit power threshold at a specified number of consecutive polling instances. In this embodiment, the first specified amount and the specified number of consecutive polling instances are programmable. The specified amount of time is a summation of durations of polling intervals between the detection of the presence of the object and the specified number of consecutive polling instances.

In another embodiment, the object is a human body part, and the user device detects the presence of the human body part using a sensor disposed on or within the user device. The sensor may be a proximity sensor, an inertial sensor, or a combination of both. In another embodiment, the user device detects the presence of the human body part by detecting a user interaction condition of the user device. For example, the user device can monitor user input and determine if the monitored user input is a designated type that indicates the presence of the human body part.

In one embodiment, the motion data is continuously or periodically gathered and stored in a motion data cache. The motion data cache may store motion data over a sample period (e.g., motion data for the last 5 seconds). Therefore, when a command to transmit information is received, the user device may immediately determine whether the presence of a human body part is detected. In one embodiment, this determination is made prior to receiving a command to transmit information. In another embodiment, motion data is not obtained until a command to transmit information is received (e.g., blocks 705 and 710 are reversed). In this embodiment, the user device waits a predetermined time period (e.g., 5 seconds) while it gathers motion data before continuing to block 715.

Figure 8:
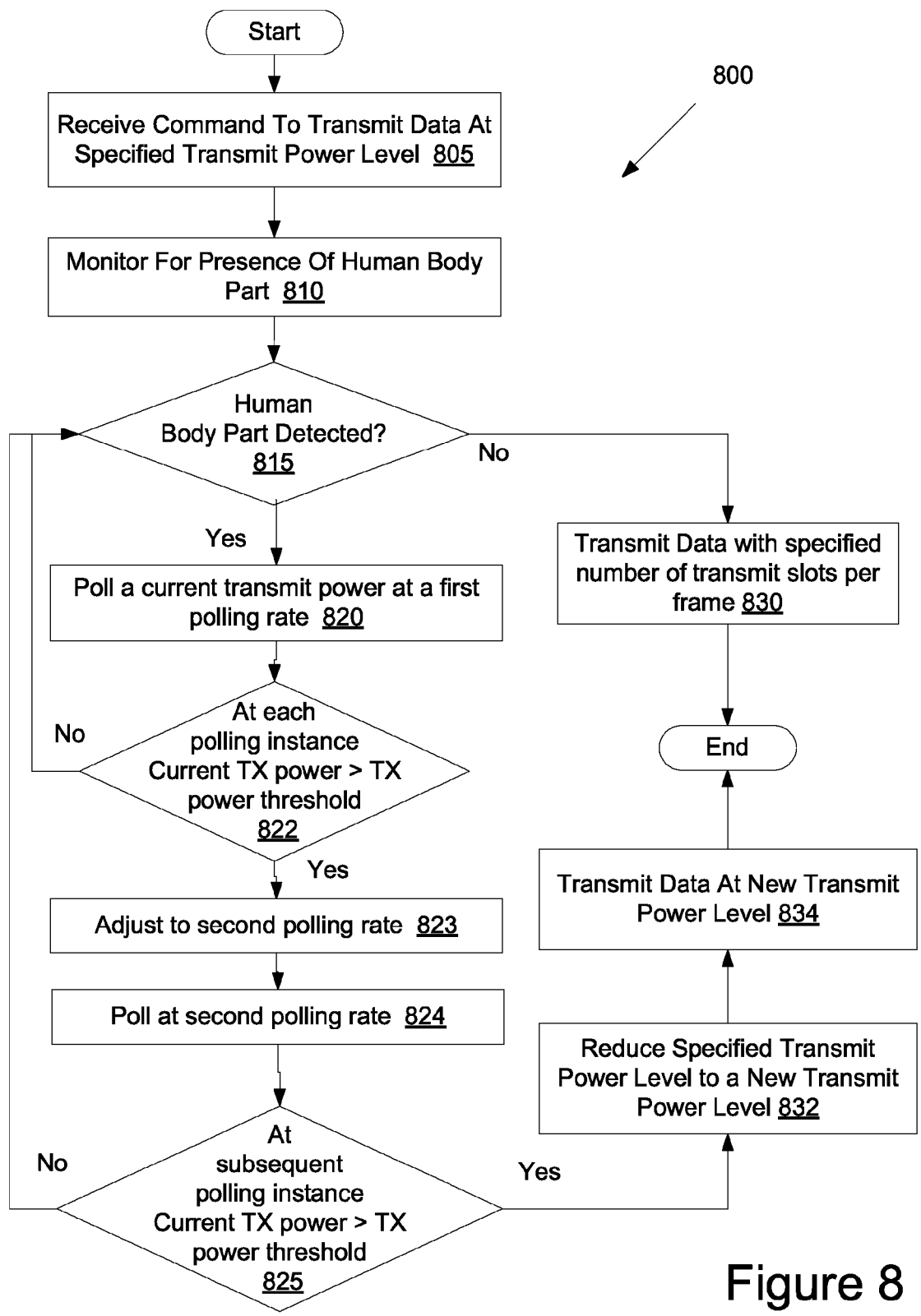
FIG. 8 is a flow diagram of another embodiment of a method for dynamic power throttling for data transmission in response to detecting a human body part.

FIG. 8 is a flow diagram of another embodiment of a method 800 for dynamic power throttling for data transmission in response to detecting a human body part. At block 805 of method 800, a command to transmit data at a specified transmit power level is received. The command may be received from a wireless carrier, a WiFi hotspot, or other wireless communications system, or may be received from another component of the user device or an application running on the user device (e.g., an application for creating a wireless ad hoc network).

The user device monitors for the presence of a human body part (block 810). In one embodiment, the user device monitors for the presence of the human body using one or more sensors disposed on or within the user device. Alternatively, other monitoring techniques may be used as described herein. At block 815, the user device determines whether a human body part has been detected proximate to the user device. If no human body part has been detected, the method proceeds to block 830 and the data is transmitted with the specified transmit power level transmit power level. If a human body part has been detected at block 815, the method proceeds to block 820.

At block 820, the user device starts polling a current transmit power at a first polling rate. At each polling instance, the user device determines whether the current transmit power exceeds the transmit power threshold (block 822). If not, the method returns to block 815. If the current transmit power exceeds the transmit power threshold at block 822, the method proceeds to block 823. The method continues polling the current transmit power at the first polling rate until the current transmit power exceeds the transmit power threshold (block 822) or the human body part is no longer detected (block 815).

At block 823, the user device adjust the first polling rate to a second polling rate, and polls the current transmit power at the second polling rate (block 824). At block 825, the user device determines at a subsequent polling instance (at the second polling rate) whether the current transmit power still exceeds the transmit power threshold. If the current transmit power does not still exceeds the transmit power threshold, the method returns to block 815 to determine whether the human body part is still detected. If the current transmit power still exceeds the transmit power threshold, the method proceeds to block 832. At block 832, the user device adjust the specified transmit power level to a second transmit power level. The user device then transmits the data at the new transmit power level (block 834). The user device may specify the amount to reduce the specified transmit power level or the new transmit power level itself. For example, the power manager can instruct the modem to the use the new transmit power level or to reduce the transmit power level by a specified amount.

In a further embodiment, the user device resumes the polling the current transmit power at the first polling rate if at the subsequent polling instance the current transmit power still exceeds the transmit power threshold at block 825. In another embodiment, at block 825, the user device resumes the polling at the second polling rate. If the current transmit power still exceeds the transmit power threshold at another subsequent polling instance, the user device further reduces the second transmit power level by a second specified amount to a third transmit power level, and transmits the data at the third transmit power level. If at the other subsequent polling instance the current transmit power still exceeds the transmit power threshold, the user device adjusts the polling to poll at a third polling rate.

In a further embodiment, the user device detects an absence of the human body part after detection of the presence of the human body part. The user device can detect the absence at any point in the polling process. In response to the detection of the absence of the human body part, the user device restores the third transmit power (or second transmit power) to the specified transmit power level. In a further embodiment, the user device stops the polling in response to the detecting the absence of the human body part. In another embodiment, the user device detects that the human body part is no longer detected, as opposed to detecting an absence of the human body part.

In one embodiment, the specified transmit power level is specified by a wireless carrier and is specified in the command received at block 805. Alternatively, the specified transmit power level can be received. In another embodiment, the specified transmit power level can be determined by the user device using the transmit power manager 135 or 200 described above. In another embodiment, the user device is classified as a power class 3 device (e.g., default power class), and hence transmits at 24 dBm. On proximity detection and upon detecting that the current transmit power still exceeds the transmit power threshold at a subsequent polling instance, the user device can classify itself as a lower power transmitting device without manually controlling the power. For example, the user device can classify itself as a power class 4 device and hence transmits only at 21 dBm providing 3 dB release. Alternatively, other transitions between power classes may be made by the 3G user device without manually controlling the power as would be appreciated by one of ordinary skill in the art having the benefit of this disclosure.

In one embodiment, the first polling rate, the second polling rate, the transmit power threshold, and the first specified amount are programmable values. In another embodiment, the second specified amount is also programmable. In another embodiment, more than two specified amounts are programmable. These values may be store din volatile or non-volatile memory.

In another embodiment, the user device obtains motion data from one or more proximity sensors, motion data from one or more inertial sensors, or any combination thereof. The user device determines from the motion data whether the presence of the human body part is detected. The presence of a human body part may be detected when the proximity sensors detect that the human body part is proximate to the user device, e.g., touching the user device or in proximity to the user device. In another embodiment, the user device determines whether the motion data includes linear accelerations that exceed a linear acceleration threshold. The user device also determines whether the motion data includes angular accelerations that exceed an angular acceleration threshold. The user device may compute a human body part presence from the angular accelerations and linear accelerations in the motion data. If the human body part presence score exceeds a threshold, the user device determines that the presence of a human body part is detected. The presence of a human body part may be more accurately detected based on angular accelerations than linear accelerations. Accordingly, in one embodiment angular accelerations are weighted more heavily than linear accelerations in the determination of whether a human body part is detected (e.g., angular accelerations have a greater contribution to the human body part presence score).

In some cases, a user device that is held by the user is more likely to experience linear accelerations in some directions than in other directions. Similarly, the user device that is held by the user may be more likely to experience angular accelerations in some directions than in other directions. Accordingly, there may be separate linear acceleration thresholds (or translational motion thresholds) for each axis of a three axis accelerometer. Additionally, there may also be separate angular acceleration thresholds (e.g., a yaw threshold, a pitch threshold and a roll threshold). Each of the separate linear acceleration thresholds and angular acceleration thresholds may have different value. Additionally, linear accelerations along different axes may be weighted differently and angular accelerations about different axes may be weighted differently in the determination of whether the presence of a human body part is detected (e.g., whether a user is holding the user device). In one embodiment, the human body part presence score is based on a weighted combination of values from linear accelerations along each of the axes and angular accelerations about the axes. The presence of a human body part may be detected when angular accelerations exceeding an angular acceleration threshold and/or linear accelerations exceeding a linear acceleration threshold are detected. The presence of a human body part may also be detected when the user device has a tilt angle that meets a tilt angle criterion (e.g., exceeds a tilt angle threshold or falls short of a tilt angle threshold).

The presence may also be detected when the human body part is detected within a specified distance from the antenna. For example, the user device may determine a distance between the detected object and one or more antennas of the user device, and then determine whether the object has been detected within a distance threshold (predetermined distance). If the distance is not within the distance threshold, the data is transmitted by the one or more antennas at the specified transmit power level. If the distance is within the distance threshold, the data is transmitted by the one or more antennas at a reduced transmit power level as described herein.

In one embodiment, the antenna is at a top of the user device. While a user holds the user device, the user's hand will experience continuous slight involuntary motions. Depending on where the user is holding the user device, these involuntary motions may be slightly different, and will cause the inertial sensor to sense different accelerations. Based on these differences of accelerations, the user device can determine whether the user is holding the user device near the top of the user device (e.g., near the antenna) or near the bottom of the user device (e.g., away from the antenna).

In some cases, a user device that is held by the user is more likely to experience linear accelerations in some directions than in other directions. Similarly, the user device that is held by the user may be more likely to experience angular accelerations in some directions than in other directions. Accordingly, there may be separate linear acceleration thresholds (or translational motion thresholds) for each axis of a three axis accelerometer. Additionally, there may also be separate angular acceleration thresholds (e.g., a yaw threshold, a pitch threshold and a roll threshold). Each of the separate linear acceleration thresholds and angular acceleration thresholds may have different value. Additionally, linear accelerations along different axes may be weighted differently and angular accelerations about different axes may be weighted differently in the determination of whether the presence of a human body part is detected (e.g., whether a user is holding the user device). In one embodiment, the human body part presence score is based on a weighted combination of values from linear accelerations along each of the axes and angular accelerations about the axes.

In embodiments where the user device is on a moving vehicle such as a car, train, bus, airplane, boat, etc., the motion data may incorrectly indicate that the presence of a human body part is detected (e.g., that the user device is in contact with a human body part). For example, motions that occurred due to car movement, train movement, and so forth may satisfy the criteria for the presence of a human body part. In one embodiment, such false positives can be reduced by filtering the data using a moving vehicle filter. In these embodiments, the user device compares the received motion data to motion signatures of one or more moving vehicle filters. Each of the motion signatures for a moving vehicle filter represents common accelerations that may be detected while the user device is on a moving vehicle of the appropriate type. By comparing the motion data to each of the motion signatures, the user device may determine which, if any, moving vehicle type the user device is on. If the motion data fails to match the motion signature of any moving vehicle filter, the method ends. If, on the other hand, the motion data matches a motion signature of a moving vehicle filter, the method may filter the obtained motion data using the identified moving vehicle filter. This may remove acceleration measurements that are caused by the moving vehicle. The remaining motion data may reflect motions that are caused by user motions (e.g., from a user holding the user device). In one embodiment, a user may select a moving vehicle filter. For example, the user may indicate that he is riding in a car, a train, etc.

As described above, in some embodiments, an antenna may be used as a proximity sensor. In these embodiments, the method may determine whether it is safe to disconnect an antenna from a wireless modem that sends and receives transmissions via the antenna. If it is safe to disconnect the antenna from the wireless modem, the method causes a switch to disconnect the antenna from the modem and connect the antenna to the sensor circuitry. This may be the case, for example, if method determines that the antenna will not be or is unlikely to be needed to receive an incoming message or send an outgoing message within a predetermined time period (e.g., 100 ms or 50 ms). If it is not safe to disconnect the antenna from the modem, the method returns to determine whether it is safe to disconnect or not.

Once disconnected, the antenna is then used to monitor for the presence of a human body part. The antenna may monitor for the presence of a human body part for the predetermined time period. After the predetermined time period expires, the method causes the switch to disconnect the antenna from the sensor circuitry and reconnect the antenna to the wireless modem. The wireless modem can then resume sending and receiving transmissions.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present invention should, therefore, be determined with reference to the appended claims, along with the full scope of equivalents to which such claims are entitled.

What is claimed is:

1. A method, implemented by a user device programmed to perform the following, comprising:
    transmitting first data at a specified transmit power level;
    detecting a presence of a human body part proximate to the user device;
    in response to the detection of the presence of the human body part, polling a current transmit power of the user device at a first polling rate;
    at each polling instance, determining whether the current transmit power exceeds a transmit power threshold;
    in response to the current transmit power exceeding the transmit power threshold at one of the polling instances, adjusting the first polling rate to a second polling rate and polling the current transmit power at the second polling rate;
    in response to the current transmit power still exceeding the transmit power threshold at a subsequent polling instance, reducing the specified transmit power level by a first specified amount; and
    transmitting second data at the reduced transmit power level.

2. The method of claim 1, wherein the specified transmit power level is specified by a wireless carrier.

3. The method of claim 1, further comprising resuming said polling the current transmit power at the first polling rate in response to the current transmit power still exceeding the transmit power threshold at the subsequent polling instance.

4. The method of claim 1, further comprising resuming said polling the current transmit power at the second polling rate in response to the current transmit power still exceeding the transmit power threshold at the subsequent polling instance.

5. The method of claim 1, further comprising:
in response to the current transmit power still exceeding the transmit power threshold at another subsequent polling instance, further reducing the reduced transmit power level by a second specified amount; and
transmitting third data at the further reduced transmit power level.

6. The method of claim 5, further comprising in response to the current transmit power still exceeding the transmit power threshold at the other subsequent polling instance, adjusting said polling to polling the current transmit power at a third polling rate.

7. The method of claim 1, further comprising:
detecting an absence of the human body part after said detecting the presence of the human body part; and
in response to the detection of the absence of the human body part, restoring the reduced transmit power level to the specified transmit power level.

8. The method of claim 5, further comprising:
detecting an absence of the human body part after said detecting the presence of the human body part; and
in response to the detection of the absence of the human body part, restoring the further reduced transmit power level to the specified transmit power level.

9. The method of claim 7, further comprising, in response to the detection of the absence of the human body part, stopping said polling the current transmit power.

10. The method of claim 1, further comprising continuing said polling the current transmit power at the first polling rate until the current transmit power exceeds the transmit power threshold or the human body part is no longer detected.

11. The method of claim 1, wherein the first polling rate, the second polling rate, the transmit power threshold, and the first specified amount are programmable values.

12. The method of claim 1, wherein the first polling rate, the second polling rate, the transmit power threshold, and the first specified amount are stored in non-volatile memory of the user device.

13. A non-transitory computer-readable storage medium comprising instructions that when executed by a computing system perform the following operations:
transmitting first data at a first transmit power level;
detecting a presence of an object;
in response to the detection of the object, delaying for a specified amount of time before determining whether to adjust the first transmit power level to a second transmit power level, wherein the specified amount of time is programmable, wherein the delaying comprises:
starting a polling timer for the specified amount of time in response to the detection of the presence of the object; and
at an expiration of the polling timer, determining whether a current transmit power exceeds a transmit power threshold, wherein the first transmit power level is adjusted to the second transmit power level when the current transmit power exceeds the transmit power threshold; and
at an end of the specified amount of time, determining whether to adjust the first transmit power level to the second transmit power level.

14. The computer-readable storage medium of claim 13, wherein said delaying further comprises:
starting the polling timer again when the current transmit power does not exceed the transmit power threshold; and
adjusting a duration of the polling timer when the current transmit power exceeds the transmit power threshold.

15. The computer-readable storage medium of claim 14, wherein said delaying further comprises:
starting the polling timer with the adjusted duration; and
at an expiration of the polling timer with the adjusted duration, determining whether the current transmit power still exceeds the transmit power threshold, wherein the first transmit power level is adjusted to the second transmit power level when the current transmit power still exceeds the transmit power threshold, and wherein the specified amount of time is an original duration of the polling timer plus the adjusted duration of the polling timer.

16. The computer-readable storage medium of claim 13, wherein said delaying further comprises:
polling current transmit power at a first polling rate in response to the starting the polling timer;
at each polling instance, determining whether the current transmit power exceeds the transmit power threshold; and
adjusting the first polling rate to a second polling rate when the current transmit power exceeds the transmit power threshold.

17. The computer-readable storage medium of claim 16, further comprising reducing the first transmit power level by a first specified amount to the second transmit power level when the current transmit power exceeds the transmit power threshold at a specified number of consecutive polling instances, wherein the first specified amount and the specified number of consecutive polling instances are programmable.

18. The computer-readable storage medium of claim 17, further comprising adjusting the second polling rate to a third polling rate after said reducing the first transmit power level to the second transmit power level by the first specified amount.

19. The computer-readable storage medium of claim 17, further comprising reducing the second transmit power level by a second specified amount to a third transmit power level when the current transmit power still exceeds the transmit power threshold after the specified number of consecutive polling instances, wherein the second specified amount is programmable.

20. The computer-readable storage medium of claim 13, further comprising adjusting the first transmit power level to the second power level when the current transmit power exceeds the transmit power threshold, wherein said adjusting comprises reducing the first transmit power level by a first specified amount to the second transmit power level when the current transmit power exceeds the transmit power threshold at a specified number of consecutive polling instances, wherein the first specified amount and the specified number of consecutive polling instances are programmable, and wherein the specified amount of time is a summation of durations of polling intervals between the detection of the presence of the object and the specified number of consecutive polling instances.

21. The computer-readable storage medium of claim 16, wherein the second polling rate is greater than the first polling rate.

22. The computer-readable storage medium of claim 18, wherein the second polling rate is greater than the third polling rate.

23. The computer-readable storage medium of claim 13, wherein the object is a human body part, and wherein said detecting the presence of the human body part comprises detecting the presence of the human body part using a sensor disposed on or within the computing system.

24. The computer-readable storage medium of claim 13, wherein the object is a human body part, and wherein said detecting the presence of the human body part comprises detecting a user interaction condition of the computing system.

25. The computer-readable storage medium of claim 13, further comprising:
  detecting a condition where the first transmit power should not be adjusted to the second transmit power level; and
  in response to said detecting the condition, preventing said determining whether to adjust the first transmit power level to the second transmit level power.

26. The computer-readable storage medium of claim 25, wherein the condition comprises at least one downloading a file to the computing system, communicating signaling data to or from the computing system, or communicating voice data to or from the computing system.

27. The computer-readable storage medium of claim 13, wherein the computing system is an electronic book reader.

28. A user device comprising:
  an antenna configured to transmit first data at a first transmit power level;
  a processing component to receive sensor data from a sensor and to determine, based on the sensor data, whether a presence of a human body part is detected; and
  a power manager, configured to be executed from a memory by the processing component, to delay for a specified amount of time in response to the detection of the human body part by starting a polling timer for the specified amount of time in response to the detection of the presence of the human body part and, at an expiration of the polling timer, determining whether a current transmit power exceeds a transmit power threshold, wherein the first transmit power level is adjusted to a second transmit power level when the current transmit power exceeds the transmit power threshold, and, at an end of the specified amount of time, determine whether to adjust the first transmit power level to the second transmit power level, wherein the specified amount of time is programmable.

29. The user device of claim 28, further comprising the sensor disposed on or within the user device.

30. The user device of claim 28, wherein the sensor is a proximity sensor, and wherein the processing component is to receive the sensor data from the proximity sensor and to determine, based on the sensor data, whether the presence of the human body part is detected.

31. The user device of claim 28, wherein the sensor is an inertial sensor, and wherein the processing component is to receive motion data from the inertial sensor and to determine, based on the motion data, whether the presence of the human body part is detected.

32. The user device of claim 31, wherein the inertial sensor comprises at least one of an accelerometer or a gyroscope.

33. The user device of claim 28, further comprising a modem, coupled to the antenna and the processing component, to determine whether to adjust and to delay the determination, wherein the processing component resides in the modem.

34. A user device comprising:
  an antenna configured to transmit first data at a first transmit power level;
  a processing component to receive sensor data from a sensor and to determine, based on the sensor data, whether a presence of a human body part is detected; and
  a power manager, configured to be executed from a memory by the processing component, to delay for a specified amount of time in response to the detection of the human body part, and, at an end of the specified amount of time, determine whether to adjust the first transmit power level to a second transmit power level, wherein the specified amount of time is programmable;
  a modem, coupled to the antenna, to transmit the first data via the antenna at the first transmit power level,
  wherein the processing component is a processor coupled to the modem,
  wherein the processor executes the power manager, and wherein the processor is configured to:
    detect a presence of the human body part proximate to the user device; and
    instruct the modem to transmit second data via the antenna at the second transmit power level after the determination to adjust the first transmit power level when the presence of the human body part is detected.

35. The user device of claim 34, wherein the processor is configured to detect the presence of the human body part by detecting a user interaction condition of the user device.

36. The user device of claim 28, wherein the user device is an electronic book reader.

* * * * *